US012561008B2

(12) United States Patent
Nocon et al.

(10) Patent No.: US 12,561,008 B2
(45) Date of Patent: *Feb. 24, 2026

(54) GESTURE RECOGNITION DEVICE AND METHOD FOR SENSING MULTI-FACTOR ASSERTION

(71) Applicant: Warner Bros. Entertainment Inc., Burbank, CA (US)

(72) Inventors: Nathan Nocon, Valencia, CA (US); Tom McWilliams, Studio City, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/917,799

(22) Filed: Oct. 16, 2024

(65) Prior Publication Data

US 2025/0044877 A1    Feb. 6, 2025

Related U.S. Application Data

(63) Continuation of application No. 18/334,045, filed on Jun. 13, 2023, now Pat. No. 12,153,739, which is a (Continued)

(51) Int. Cl.
*G06F 3/01* (2006.01)
*A63F 9/24* (2006.01)
(Continued)

(52) U.S. Cl.
CPC ................ *G06F 3/017* (2013.01); *A63F 9/24* (2013.01); *A63H 33/22* (2013.01); *G06F 3/016* (2013.01);
(Continued)

(58) Field of Classification Search
CPC ........ G06F 3/016; G06F 3/346; G06F 3/0416; G06F 3/044; G06F 2203/04104;
(Continued)

(56) References Cited

U.S. PATENT DOCUMENTS 9,497,819 B2    11/2016  Van et al.
10,222,868 B2    3/2019  Martinez Fernandez et al.
(Continued)

FOREIGN PATENT DOCUMENTS

EP           3007030 A1    4/2016
KR    10-2017-0035547 A    3/2017
(Continued)

OTHER PUBLICATIONS

Combined Search and Examination Report Under Sections 17 and 18(3) for Great Britain Patent Application No. GB2305231.9, dated Oct. 5, 2023, (5 pages), Intellectual Property Office, South Wales, United Kingdom.
(Continued)

*Primary Examiner* — Ryan A Lubit
(74) *Attorney, Agent, or Firm* — ALSTON & BIRD LLP

(57) ABSTRACT

A gesture-recognition (GR) device is disclosed that includes a capacitive touch sensor panel and a controller. The capacitive touch sensor panel comprises a plurality of sensing pads arranged in a cylindrical pattern inside a handle of the GR device and detects a multi-factor touch assertion at a set of sensing pads of the plurality of sensing pads. The controller transmits a driving signal to each of the plurality of sensing pads for the detection of the multi-factor touch assertion, generates an assertion signal, determines a signal sequence based on the assertion signal, and converts a current inactive state of the GR device to an active state based on a validation of the determined signal sequence corresponding to the multi-factor touch assertion and an inferred user intent.

20 Claims, 16 Drawing Sheets

Related U.S. Application Data continuation of application No. 17/547,351, filed on Dec. 10, 2021, now Pat. No. 11,698,684, which is a continuation-in-part of application No. PCT/US2020/049372, filed on Sep. 4, 2020.

(60) Provisional application No. 63/250,315, filed on Sep. 30, 2021, provisional application No. 62/897,220, filed on Sep. 6, 2019.

(51) Int. Cl.

| | |
|---|---|
| *A63H 33/22* | (2006.01) |
| *G06F 3/0346* | (2013.01) |
| *G06F 3/041* | (2006.01) |
| *G06F 3/044* | (2006.01) |
| *G06V 40/10* | (2022.01) |
| *G06V 40/20* | (2022.01) |
| *A63H 30/04* | (2006.01) |

(52) U.S. Cl.
CPC .......... *G06F 3/0346* (2013.01); *G06F 3/0416* (2013.01); *G06F 3/044* (2013.01); *G06V 40/10* (2022.01); *G06V 40/28* (2022.01); *A63F 2009/2447* (2013.01); *A63F 2009/2454* (2013.01); *A63F 2250/485* (2013.01); *A63H 30/04* (2013.01); *A63H 2200/00* (2013.01); *G06F 2203/04104* (2013.01)

(58) Field of Classification Search
CPC ........ A63F 9/24; A63F 13/211; A63F 13/212; A63F 13/24; A63F 13/428; A63F 2009/2447; A63F 2009/2454; A63F 2250/485; G06V 40/10; G06V 40/28; A63H 30/04; A63H 33/22; A63H 2200/00
See application file for complete search history.

(56) References Cited

U.S. PATENT DOCUMENTS

| | | | |
|---|---|---|---|
| 10,281,987 | B1 | 5/2019 | Yang et al. |
| 11,003,307 | B1 | 5/2021 | Ravasz et al. |
| 11,021,098 | B1 | 6/2021 | Brown et al. |
| 11,086,475 | B1 | 8/2021 | Ravasz et al. |
| 11,422,669 | B1 | 8/2022 | Ravasz et al. |
| 2004/0204240 | A1 | 10/2004 | Barney |
| 2010/0134308 | A1 | 6/2010 | Barnardo et al. |
| 2011/0199292 | A1 | 8/2011 | Kilbride |
| 2013/0328762 | A1 | 12/2013 | Mcculloch et al. |
| 2013/0328763 | A1 | 12/2013 | Latta et al. |
| 2014/0092011 | A1 | 4/2014 | De Foras et al. |
| 2014/0139454 | A1 | 5/2014 | Mistry et al. |
| 2014/0240102 | A1 | 8/2014 | Kawash et al. |
| 2014/0267184 | A1* | 9/2014 | Bathiche ............... G06F 1/3259 345/179 |
| 2015/0105159 | A1 | 4/2015 | Palotas |
| 2015/0185713 | A1 | 7/2015 | Glickfield et al. |
| 2015/0346834 | A1 | 12/2015 | Martinez et al. |
| 2015/0363034 | A1* | 12/2015 | Hinckley ................ G06F 3/017 345/173 |
| 2016/0011668 | A1 | 1/2016 | Gilad-Bachrach et al. |
| 2016/0091980 | A1 | 3/2016 | Baranski et al. |
| 2017/0064169 | A1 | 3/2017 | Mishra et al. |
| 2017/0087453 | A1 | 3/2017 | Poisner et al. |
| 2017/0123515 | A1 | 5/2017 | Ha et al. |
| 2017/0308173 | A1 | 10/2017 | Youn et al. |
| 2018/0085673 | A1 | 3/2018 | Birkedal |
| 2018/0101231 | A1 | 4/2018 | Seth |
| 2019/0014048 | A1 | 1/2019 | Krishna Singuru |
| 2019/0025927 | A1 | 1/2019 | Cudak et al. |
| 2019/0026063 | A1 | 1/2019 | Mabey et al. |
| 2019/0325651 | A1* | 10/2019 | Bradner ................. G06F 3/011 |
| 2019/0369755 | A1* | 12/2019 | Roper ................. G06F 3/03547 |
| 2019/0380801 | A1* | 12/2019 | Savall .................... A61B 34/20 |
| 2019/0380802 | A1* | 12/2019 | Savall .................... A61B 34/20 |
| 2020/0042111 | A1* | 2/2020 | Connellan .............. G06F 3/017 |
| 2020/0081516 | A1 | 3/2020 | Zyskind et al. |
| 2020/0110928 | A1 | 4/2020 | Al et al. |
| 2020/0261815 | A1* | 8/2020 | Neal ..................... A63H 17/28 |
| 2020/0279008 | A1 | 9/2020 | Jain et al. |
| 2020/0280756 | A1 | 9/2020 | Vurimi et al. |
| 2021/0025976 | A1 | 1/2021 | Chandel et al. |
| 2021/0034188 | A1 | 2/2021 | Kwon et al. |
| 2021/0252386 | A1* | 8/2021 | VanWyk ................ A63F 13/24 |
| 2022/0100280 | A1 | 3/2022 | Nocon et al. |
| 2023/0113991 | A1 | 4/2023 | Ang et al. |

FOREIGN PATENT DOCUMENTS

| | | |
|---|---|---|
| WO | 2011/057287 A1 | 5/2011 |
| WO | 2017/052077 A1 | 3/2017 |

OTHER PUBLICATIONS

Communication Pursuant to Rule 164(1) EPC, Partial Supplementary European Search Report for Patent Application No. 20861529. 4, dated Oct. 6, 2023, (13 pages), European Patent Office, Munich, Germany.

Corrected Notice of Allowance for U.S. Appl. No. 17/547,351, dated Mar. 1, 2023, (6 pages), United States Patent and Trademark Office, US.

Corrected Notice of Allowance for U.S. Appl. No. 17/547,351 dated Mar. 1, 2023.

Examination Report for GB Application No. 22050066 dated Nov. 25, 2022.

Extended European Search Report for European Application No. 20861529.4, dated Jan. 9, 2024, 12 pages.

International Preliminary Report on Patentability Under Chapter I, for International Application No. PCT/US2020/049372, dated Mar. 17, 2022, (9 pages), The International Bureau of WIPO, Geneva, Switzerland.

International Search Report and Written Opinion for International Application No. PCT/US2020/049732, dated Dec. 1, 2020, (10 pages), Korean Intellectual Property Office, Daejeon, Republic of Korea.

Notice of Allowance and Fee(s) Due for U.S. Appl. No. 17/547,395, dated Oct. 17, 2023, (9 pages), United States Patent and Trademark Office, US.

Notice of Allowance and Fees Due for U.S. Appl. No. 17/547,483, dated Oct. 12, 2023, (8 pages), United States Patent and Trademark Office, US.

Notice of Allowance for U.S. Appl. No. 17/547,351, dated Feb. 22, 2023, (9 pages), United States Patent and Trademark Office, US.

Gregory Van Seghbroeck et al., WS-Gesture—a Gesture-based State-aware Control Framework, Dec. 1, 2010, IEEE International Conference on Service-Oriented Computing and Application, pp. 1-8 (Year: 2010).

Notice of Allowance and Fees Due (PTOL-85) Mailed on Jan. 16, 2025 for U.S. Appl. No. 17/547,443, 11 page(s).

Shuo Jiang et al., Development of a real-time hand gesture recognition wristband based on sEMG and IMU sensing, Dec. 1, 2016, IEEE International Conference on Robotics and Biomimetics, pp. 1-6 (Year: 2016).

Non-Final Rejection Mailed on Sep. 8, 2025 for U.S. Appl. No. 18/444,080, 11 page(s).

* cited by examiner

*FIG. 2*          200
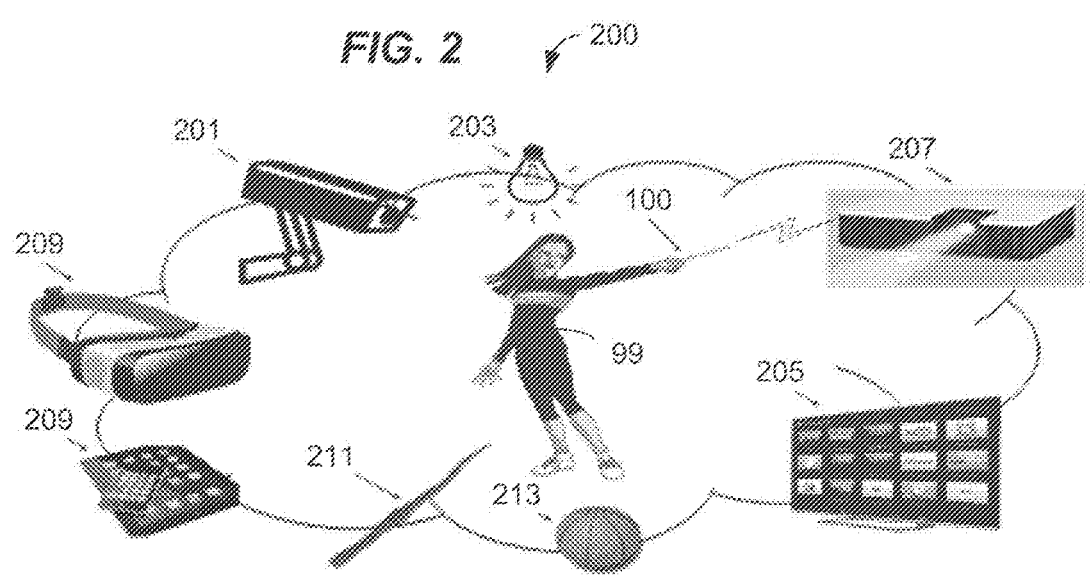
*FIG. 3*          300
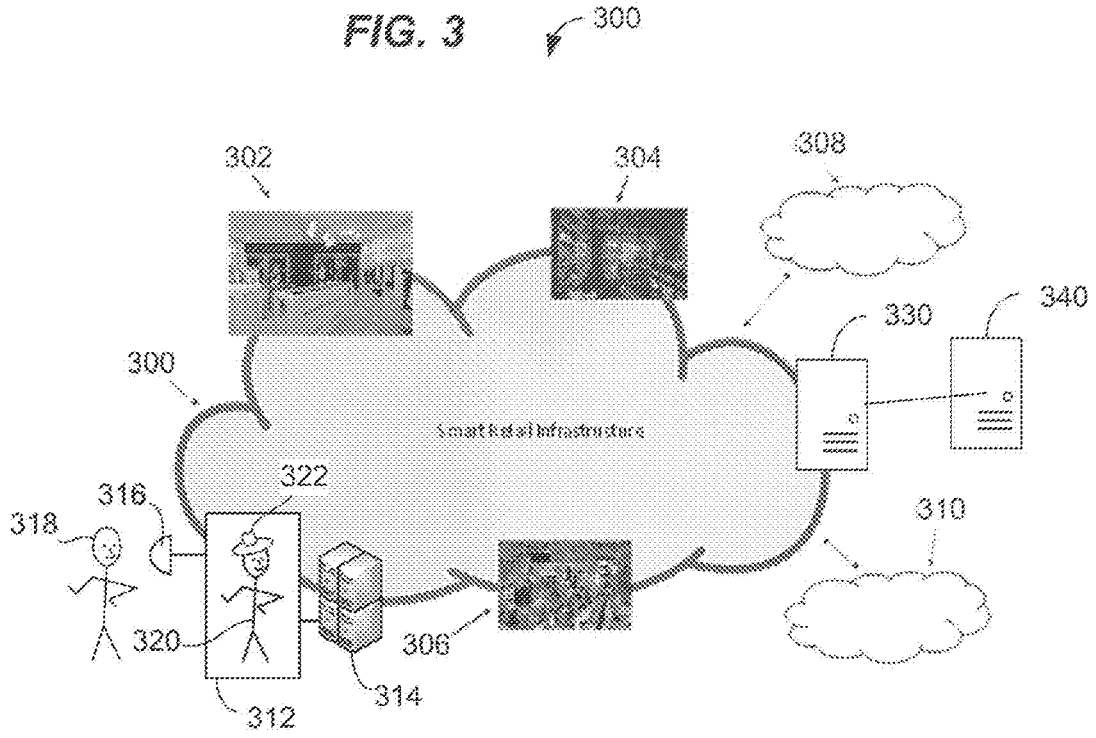

*FIG. 11*

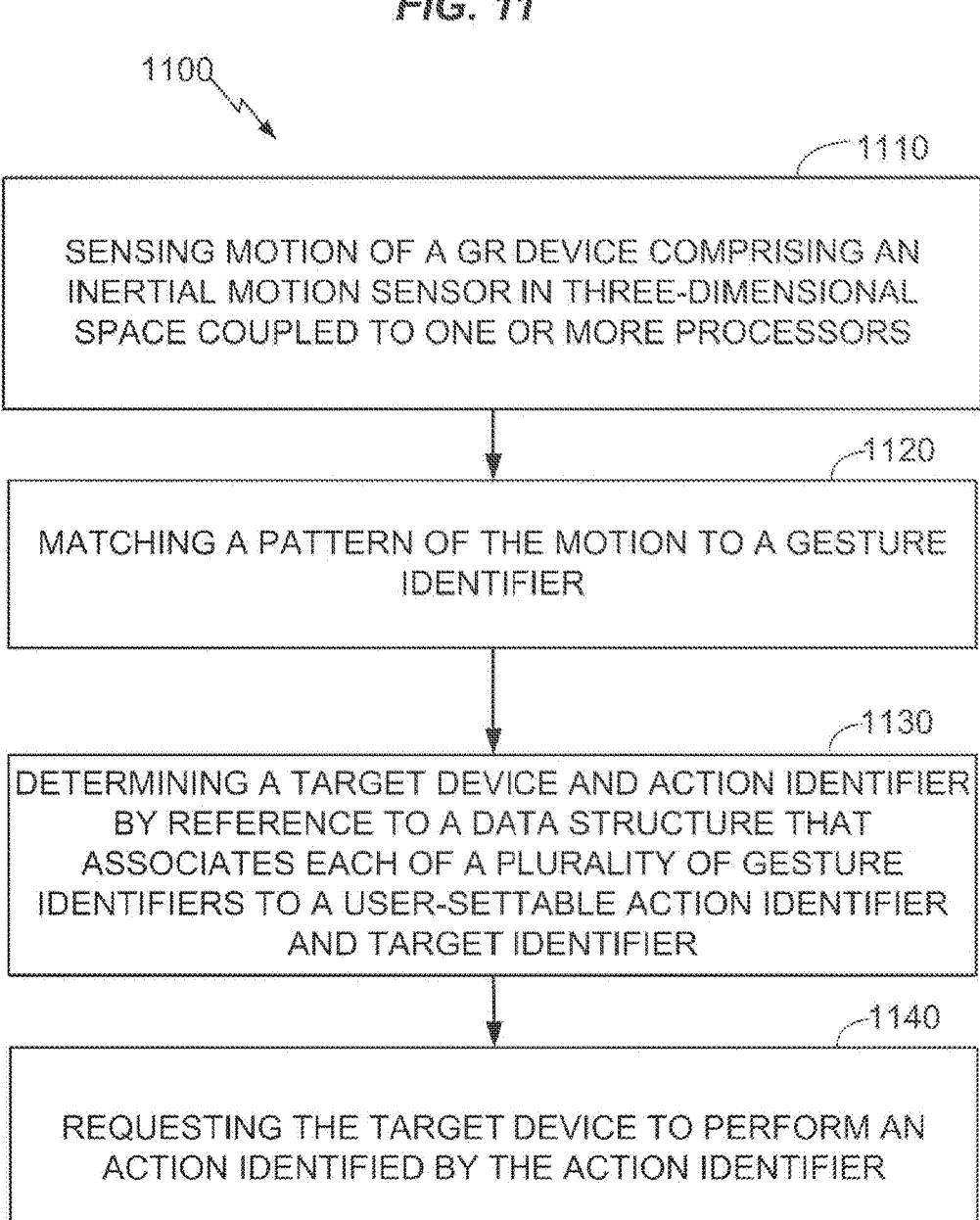

1100

1110

SENSING MOTION OF A GR DEVICE COMPRISING AN INERTIAL MOTION SENSOR IN THREE-DIMENSIONAL SPACE COUPLED TO ONE OR MORE PROCESSORS

1120

MATCHING A PATTERN OF THE MOTION TO A GESTURE IDENTIFIER

1130

DETERMINING A TARGET DEVICE AND ACTION IDENTIFIER BY REFERENCE TO A DATA STRUCTURE THAT ASSOCIATES EACH OF A PLURALITY OF GESTURE IDENTIFIERS TO A USER-SETTABLE ACTION IDENTIFIER AND TARGET IDENTIFIER

1140

REQUESTING THE TARGET DEVICE TO PERFORM AN ACTION IDENTIFIED BY THE ACTION IDENTIFIER

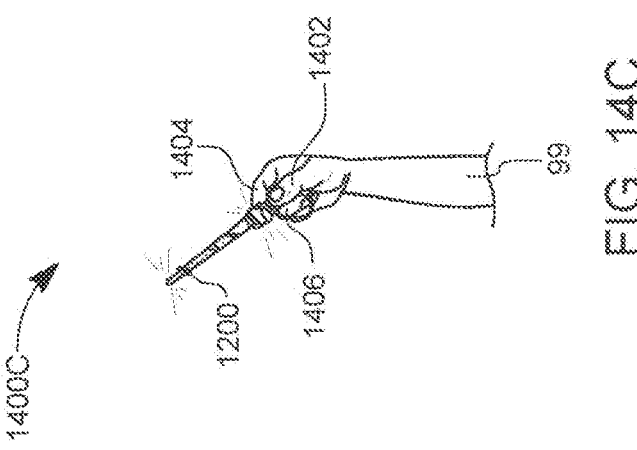
FIG. 14C
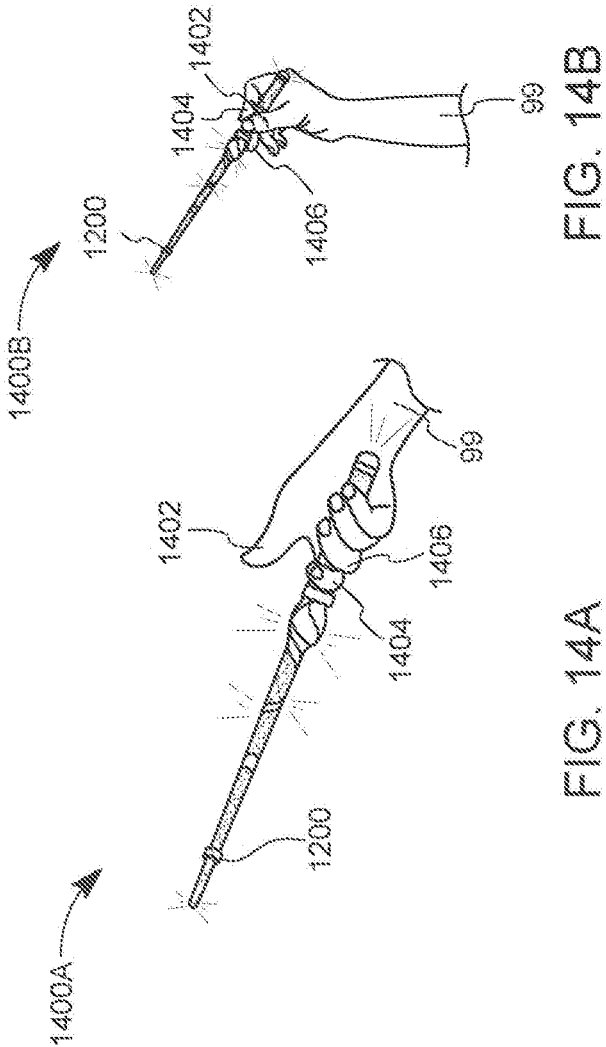
FIG. 14B
FIG. 14A

GESTURE RECOGNITION DEVICE AND METHOD FOR SENSING MULTI-FACTOR ASSERTION

CROSS-REFERENCE TO RELATED APPLICATION

This patent application claims priority to, and the benefit from, and is a continuation of U.S. patent application Ser. No. 18/334,045, filed Jun. 13, 2023, which is a continuation of U.S. patent application Ser. No. 17/547,351, filed Dec. 10, 2021, which claims priority to U.S. Provisional Application No. 63/250,315, filed on Sep. 30, 2021, and is a continuation-in-part of International Application No. PCT/US20/49372, filed on Sep. 4, 2020, and which claims priority to U.S. Provisional Application No. 62/897,220, filed on Sep. 6, 2019.

Each of the above referenced applications is hereby incorporated herein by reference in its entirety.

FIELD

The present application relates to machine-human interfaces, and more particularly to apparatus, systems and methods for enabling gesture-centric control input for computer processes, and related applications. Further, certain embodiments of the disclosure relate to a gesture recognition device and a method for sensing multi-factor assertion.

BACKGROUND

Various user interface devices have been developed for interacting with machines, especially computers, by detecting movement of a body part or hand-held device.

A first type uses sensors to detect body movement using a wireless sensor, for example an infrared sensor.

A second type relies on sensing movement of a sensor that is attached to or grasped by the user. For example, pointing devices, e.g., an electronic mouse, can detect movement in two dimensions, depending on the model. Smartphones and similar devices include position and orientation sensors that can sense movement of the device for input to any application the device can run. Handheld controllers for virtual reality translate hand movement into virtual hand movement in a virtual space.

Toy electronic wands that emit light or tactile vibration when grasped or waved about are also available. These toys lack the ability to control external devices. The user receives the mere pleasure of observing light or tactile emission from the wand. Further, such toy electronic wands incorporate a reflector in the tip that reflects the light back after it is emitted by an external infrared (IR) camera. Such toy wands require an external facing camera, such as infrared (IR) camera, that traces the movement of the reflected invisible light to recognize the gestures. Thus, such toy wand is required to be within the sight of the external facing camera. However, such toy wands are more likely to register false positives due to lack identification of intentional assertion for the purpose of recognizing gestures intentionally performed by a user. Further, due to frequent touch sensing periods and faster duty cycles, power consumption of such toy wands may be quite high.

It is desirable to develop new methods, apparatus and systems for gesture-centric user interfaces, that enable users to control a variety of electronic devices or perform a variety of actions in the real world with gestures.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a gesture-recognition (GR) device made to be held or worn by a user includes an electronic processor configured by program instructions in memory to recognize a gesture. As used herein, a "gesture" is a pattern of movements, such as, for example, up-and-down, side-to-side, inward-outward and/or any combination thereof. The movements may be of a sensor integrated with an associated prop. In an aspect, a movement sensor is attached to (e.g., incorporated into the electronics of) the GR device. In another aspect, the GR device is capable of sensing 3-dimensional motion with up to six degrees of freedom (three linear axes, and three rotational axes), plus three axes of geospatial orientation if desired, using the movement sensor (e.g., an inertial measurement unit (IMU)).

To recognize a gesture, the processor of the gesture-recognition (GR) device detects a pattern of movements, classifies the pattern to a type or rejects it as unclassifiable, and associates the type (if any) to an electronic instruction. It may perform any or all these operations locally or remotely, using a heuristic algorithm, a rules-based algorithm, or a combination of heuristic and rules-based algorithm. In an aspect, the processor may access a library comprising a plurality of action identifiers associated with a plurality of gesture types to identify an action associated with the recognized gesture type from a library. As used herein, an "action" includes user-directed changes in machine states, for example, illuminating a light, extinguishing a light, retrieving content, playing content, jumping ahead or backwards in content, opening a door, or any of the innumerable things that a machine controlled by an electronic processor can do. In the context of a data library, an "action identifier" is data that enables the action to be identified, for example, a pointer, an instruction set or module, or other identification code. In a related aspect, the processor, or a processor of an associated interface device, may include instructions that enable a user to edit the associations between action identifiers and gesture types.

In another aspect, the processor of the GR device, or another in communication with it, may send a signal to one or more targeted ancillary devices, causing each ancillary device to execute instructions performing the identified action. For example, the processor may execute instructions to perform the identified action that include electronically transmitting signals to a second electronic processor located in a second device. The second device may be, or may include, at least one of a light, a television, a projector, a refrigerator, a personal smart device, an appliance, a virtual reality device, an augmented reality device, a display device, or a toy.

In related aspects, the gesture recognition device may include a light emitting device (LED), wherein the action may include altering a characteristic of light emitted from the LED device, such as, for example, its color, flashing rate, or intensity. The gesture recognition device may include an inertial measurement unit (IMU) configured to detect gestures in three-dimensional space, including gestures having six degrees of freedom (3 linear, 3 rotational) or less, plus three axes of geospatial orientation if desired. The electronic processor is configured to recognize the gesture based on signals received from the inertial measurement unit.

In some embodiments, classifying gestures by type and associating the action identifiers and gesture types may be done remotely, e.g., by a remote server or a mobile device, while characterizing a movement pattern as digital data is done by a processor of device that undergoes the movement. Thus, the GR device may initiate the first critical process in gesture recognition-converting a gesture into a wireless, machine-readable signal that can be characterized by type-without performing later operations in a chain of causation between a gesture by the user and an action by a target device. In other embodiments, the GR device may perform later operations in the chain of causation, up to but not including performing the action itself. The GR device may also perform local actions, for example, emitting sounds, vibrations, or lights, synchronized to the action performed by the targeted device. In an aspect, the GR device may perform local actions indicating other outcomes, such as a failure to classify a gesture of a recognizable type, or a failure to communicate an action identifier to a targeted device. In addition, the GR device may perform local actions indicating intermediate states, for example successful input of a gesture to type.

In other aspects, a system for providing a personalized experience may include a central electronic processor at a central location, an edge electronic processor near a first location, and a plurality of connected devices at the first location, wherein the central processor is configured to send instructions to control the plurality of connected devices at the first location to create a personalized experience for a user at the first location. The plurality of connected devices may include at least one of a user arrival notification system, a light, a mirror, a television, a projector, a virtual reality device, an augmented reality device, a speaker or a microphone.

The system may further include, in a computer memory, encoded information about capabilities of the plurality of connected devices at the first location. The information about capabilities of the plurality of connected devices at the first location may be in a database accessible by the central processor. In such embodiments, the central processor is configured to send instructions to control the plurality of connected devices at the first location to create a personalized experience for a user at the first location based on the capabilities of the plurality of connected devices at the first location. As used herein, a "personalized experience" means sensory output from the connected devices that is configured based on information defined by or for an individual user indicative of the user's preferences for the sensory output.

In an alternative, or in addition, the information about capabilities of the plurality of connected devices at the first location may be in a database accessible by the edge processor. In such embodiments, the central processor may be configured to send instructions to control the plurality of connected devices at the first location assuming full capabilities of the plurality of connected devices and the edge processor may be configured to receive the instructions and provide a personalized experience for a user at the first location based on the instructions and on capabilities of the plurality of connected devices at the first location to command a personalized experience for a user at the first location.

In an aspect, a GR device may be, or may be locally connected to, an edge processor of the system. The personalized experience may include controlling the plurality of connected devices at the first location according to a gesture-recognition library defined by of for a user of the GR device. In an aspect, an edge processor or the central processor may translate between In accordance with an aspect of the disclosure, the GR device may include a capacitive touch sensor panel comprising a plurality of sensing pads arranged in a cylindrical pattern inside a handle of the GR device. The capacitive touch sensor panel may be configured to detect a multi-factor touch assertion at a set of sensing pads of the plurality of sensing pads. The GR device may further include a controller coupled to the plurality of sensing pads. The controller may be configured to transmit a driving signal to each of the plurality of sensing pads for the detection of the multi-factor touch assertion. The controller may be further configured to generate an assertion signal that corresponds to the detected multi-factor touch assertion. The controller may be further configured to determine a signal sequence based on the received assertion signal. The controller may be further configured to convert a current inactive state of the GR device to an active state based on a validation of the determined signal sequence corresponding to the multi-factor touch assertion and an inferred user intent.

In accordance with an embodiment, the arrangement of the cylindrical pattern of the plurality of sensing pads may be such that a longitudinal axis of each sensing pad is arranged orthogonally to a circular axis inside the handle of the GR device.

In accordance with an embodiment, the arrangement of the cylindrical pattern of the plurality of sensing pads may enable a 360-degree capacitive touch for the multi-factor touch assertion.

In accordance with an embodiment, the controller is further configured to infer the user intent may be based on the detected multi-factor touch assertion and the determined signal sequence. The user intent may be inferred based on a combination of type of grip technique on the handle and subsequent finger and/or thumb press performed by a user.

In accordance with an embodiment, the assertion signal is generated may be based on the detected multi-factor touch assertion for a plurality of grip techniques. The assertion signal may correspond to one of a first detection factor, a second detection factor or an optional third detection factor. The first detection factor may be an initial assertion of at least one sensing pad on one side of the handle resulting from a natural or learned grip technique performed by a user. The second detection factor may be a subsequent additional assertion of at least one positionally opposite sensing pad by the thumb or index finger of the user. The optional third detection factor may be sensing a three dimensional movement of the GR device during the subsequent additional assertion.

In accordance with an embodiment, a first grip technique from the plurality of grip techniques for the multi-factor touch assertion may correspond to a first touch and continually maintained assertion by a second digit of hand on at least one sensing pad. The assertion signal may be generated based on the first grip technique.

In accordance with an embodiment, a second grip technique from the plurality of grip techniques for the multi-factor touch assertion may correspond to a first touch and second touch continually maintained assertions by a first and third digits of hand on at least two sensing pads, and a third touch asserted by a second digit of the hand on a remaining sensing pads between the at least two sensing pads. The assertion signal may be generated based on the second grip technique.

In accordance with an embodiment, a third grip technique from the plurality of grip techniques for the multi-factor touch assertion may correspond to a first touch and continually maintained assertion by a first digit of hand on at least one sensing pad and a second touch asserted by a second digit of the hand on at least one positionally opposite sensing pad. The assertion signal may be generated based on the third grip technique.

In accordance with an embodiment, a fourth grip technique from the plurality of grip techniques for the multi-factor touch assertion may correspond to a tap gesture provided by a first or a second digit of hand on at least one sensing pad. The assertion signal is generated based on the fourth grip technique.

In accordance with an embodiment, an accelerometer, coupled with the plurality of sensing pads, may be configured to detect the tap gesture.

In accordance with an embodiment, the controller may be further configured to change the active state of the GR device to a sleep state in absence of the multi-factor touch assertion at the set of sensing pads for a pre-defined time duration.

In accordance with an embodiment, the conversion of the current state of the GR device to the active state may be further based on the driving signal received from the controller and a touch gesture received from at least a digit of hand of a user.

In accordance with an embodiment, a frequency value of the driving signal received from the controller has a pre-defined value.

In accordance with an embodiment, a sensing period and a duty cycle of the plurality of sensing pads is less than a threshold value.

In accordance with an embodiment, the GR device may be a wireless interactive wand, or a smart wand configured to communicate wirelessly via a radio frequency (RF) or an infrared (IR) communication mode with other devices by utilizing power generated by a power storage unit.

In accordance with an embodiment, the GR device may be an interactive wand configured to illuminate in a plurality of sections by utilizing power generated by a power storage unit.

In accordance with an embodiment, the GR device may be an interactive wand configured to generate haptic feedback by utilizing power generated by a power storage unit.

In accordance with an embodiment, the capacitive touch sensor panel may be integrated on a flex printed circuit board and wrapped to form a cylindrical shape within the GR device.

In accordance with an embodiment, the capacitive touch sensor panel may be communicatively coupled to a printed circuit board housing the controller via a flex connector.

In accordance with another aspect of the disclosure, a capacitive touch sensor panel may include plurality of sensing pads is arranged in a cylindrical pattern inside a handle of a GR device, the arrangement of the plurality of sensing pads in the cylindrical pattern is such that a longitudinal axis of each sensing pad is arranged orthogonally to a circular axis around the handle of the GR device, the plurality of sensing pads communicatively coupled to a capacitive touch sensor controller. The capacitive touch sensor controller may be configured to transmit a driving signal, received from a controller, to each of the plurality of sensing pads. The capacitive touch sensor controller may be further configured to detect a multi-factor touch assertion at a set of sensing pads from the plurality of sensing pads, generate an assertion signal in response to the detected multi-factor touch assertion, and transmit the generated assertion signal to the controller. The GR device may be activated by the controller based on a validation of a signal sequence determined based on the generated assertion signal and an inferred user intent.

In accordance with an embodiment, the plurality of sensing pads may be arranged in the cylindrical pattern inside the handle such that the plurality of sensing pads is in proximity to hand digits of a user.

In accordance with yet another aspect of the disclosure, a method for sensing multi-factor touch assertion may include transmitting, by a control unit, a driving signal to a plurality of sensing pads for detection of multi-factor touch assertion. The method may further include activating, by the control unit, the plurality of sensing pads based on the received driving signal. The method may further include detecting, by the control unit, multi-factor touch assertion at a set of sensing pads from the activated plurality of sensing pads. The method may further include generating, by the control unit, an assertion signal in response to the detected multi-factor touch assertion. The method may further include determining, by the control unit, a signal sequence based on the received assertion signal. The method may further include inferring, by the control unit, a user intent based at least on the detected multi-factor touch assertion and the determined signal sequence. The method may further include converting, by the control unit, a current inactive state of the GR device to an active state based on a validation of the determined signal sequence corresponding to the multi-factor touch assertion and the inferred user intent.

In accordance with an embodiment, the assertion signal may be generated based on the detected multi-factor touch assertion for a plurality of grip techniques. The assertion signal may be generated based on one of a first grip technique, a second grip technique, a third grip technique, or a fourth grip technique from the plurality of grip techniques.

As used herein, a "client device" or "device" includes at least a computer processor coupled to a memory and to one or more ports, including at least one input port and at least one output port (e.g., a desktop computer, laptop computer, tablet computer, smartphone, PDA, etc.), including accessories such as wands, rings, and staffs so equipped. A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 2 is a diagram illustrating use cases for a GR device in a connected environment.

FIG. 3 is a diagram illustrating a smart retail environment embodying an aspect of a system for providing a personalized experience.

FIG. 11 is a flow chart illustrating a method for controlling a GR device to provide a gesture-centric user interface for controlling one or more connected devices.

FIGS. 14A to 14D are diagrams that collectively illustrate plurality of grip techniques of a GR device of FIG. 12A for the multi-factor touch assertion.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagrams relating what is known to novel aspects of the present disclosure.

Figure 1:
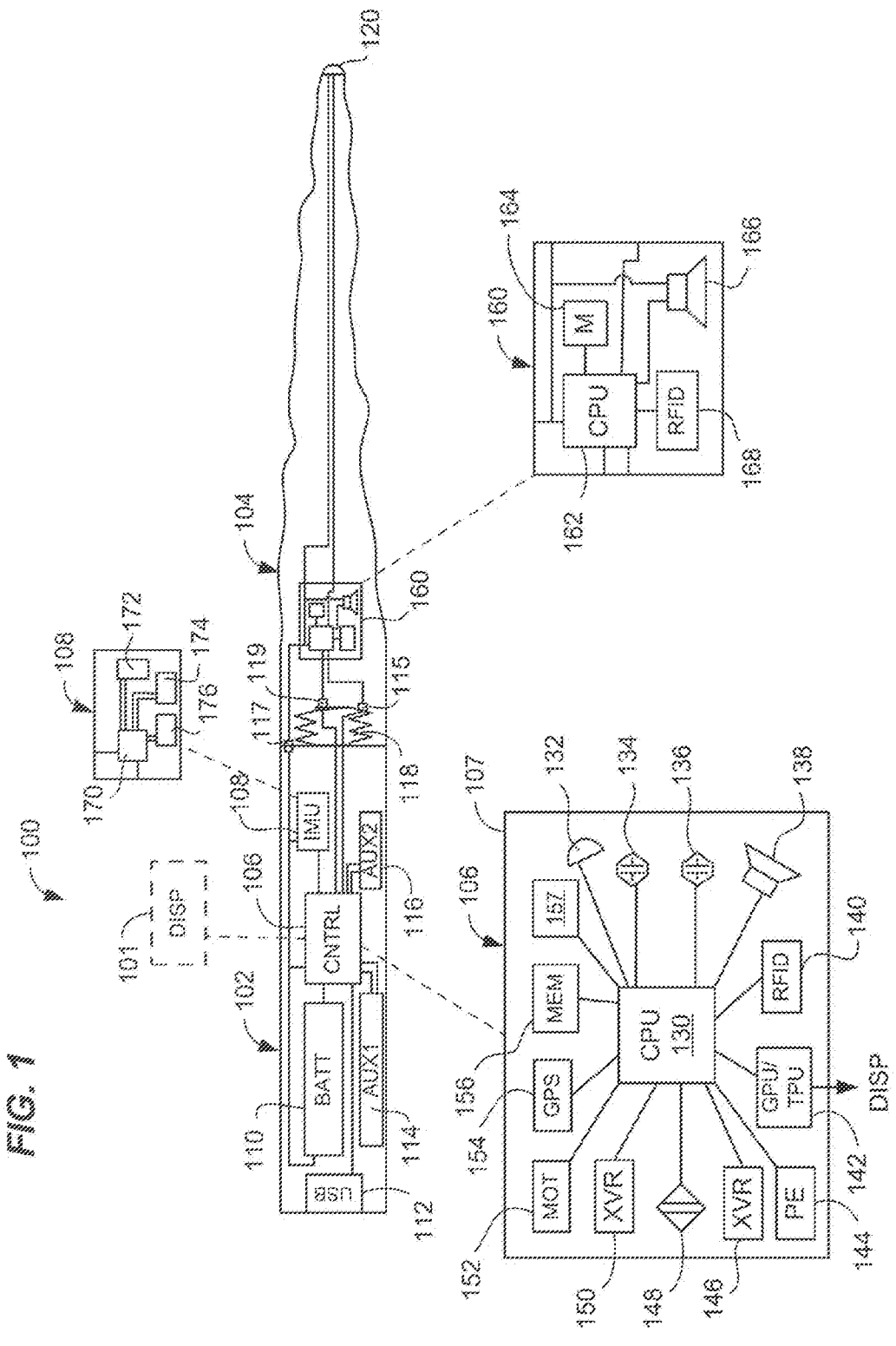
FIG. 1 is a diagram illustrating a GR device and components thereof.

Referring to FIG. 1, gesture-recognition (GR) device 100 may be used with one or more connected devices to provide enhanced experience at home, retail locations, theme parks, theaters and other locations. The GR device may include a controller 106 (e.g., a Raspberry Pi 0W) configured to perform operations of the GR device 100, including detecting different gestures formed by motion of the GR device and triggering corelated actions to be performed by connected devices, for example, devices 201-213 shown in FIG. 2, in response to each gesture. In accordance with various embodiments, the controller 106 may be interchangeably referred to as a microcontroller (MCU) or other related terminology, without any deviating from the scope of the disclosure. The connected devices 201-213 to be individually described later may each perform an action determined based on a gesture performed by user 99 holding or wearing the GR device 100, to provide an enhanced personalized experience. The user moves the GR device through a pattern of motion, and with or without a verbal command, one of the connected devices performs a desired action. A good deal of hardware and software makes this appearance of magic possible.

Referring again to FIG. 1, an embodiment of the GR device 100 may include two principal components, a base unit 102 and an elongate unit 104. In some embodiments, the base unit 102 and the elongate unit 104 may be configured as a single piece. For a GR device 100 styled as a wand, base unit 102 may be configured to be grasped by the user's hand, while the elongate unit 104 may be configured to have a form factor of a wand tip that extends outward from the base unit 102 and provides the wand's overall appearance. In some embodiments, the extendable unit 104 may be configured to be removably attached to the base unit 102. In some embodiments, the base unit 102 may be permanently fixed to the elongate unit 104. In some implementations, all the electronics may be placed in the base unit 102 while the elongate unit 104 can be devoid of any electronics. In some other implementations, a first portion of the electronics may be disposed in the base unit 102 and a second portion of the electronics may be disposed in the elongate unit 104. For example, heavier, more expensive electronic components may be placed in the base unit 102 while relatively inexpensive electronic components may be placed in the elongate unit 104. The elongate unit 104 may be provided with different appearances and capabilities to suit users' needs.

To provide interchangeability, a removable fastener 118 with electrical contacts 115, 117, 119 may be used to couple the base and elongate units 102, 104. While an internally-threaded coupling is shown, other couplings may also be suitable, for example, an externally threaded plug-and-socket, a threadless plug-and-socket with or without a locking feature, and so forth. Since the GR device is designed to be moved rapidly around, a locking feature is advantageous to prevent undesired decoupling.

Capabilities of the GR device 100 may be limited or enhanced depending on an identity of a user of the GR device 100 or the elongate unit 104. For example, the elongate unit 104 may include a radio-frequency identification device (RFID) 168 or other identification device, and a gesture recognition and control system of the GR device 100 may be configured to work differently depending on the identity of the elongate unit. For example, special commands may be "unlocked" for certain identifiers. In home settings, commands may be refused except from movements of GR devices that include identifiers registered for a household. As another example, special commands may be unlocked depending on the identity of a user. Information regarding the identity of a user may be communicated to the GR device 100 via one or more connected devices associated with the GR device 100.

While a wand is illustrated, it should be appreciated that a GR device 100 may have any suitable form factor for being held or worn by a user and carried by movements of a user's extremities. For example, a GR device 100 may be styled as a walking staff, a light stick, a ring, a body ornament, a glove, a bracelet, or any article capable of being held and moved through the air by a user. For further example, in a ring, bracelet, or similar jewelry, the base unit 102 may be contained in the body of the jewelry while the elongate unity 104 may be styled as a gem or ornament.

Ornamental features aside, operation of the GR device 100 depends on its internal circuitry and elements in its wireless network. The internal circuitry of the GR device 100 may include a controller 106 coupled to an inertial measurement unit (IMU) 108, to a power storage unit 110 (e.g., a battery), and to an input-output and power connector 112 (e.g., a Universal Serial Bus (USB) port). Optionally, the controller may be coupled to one or more auxiliary devices 114, 116, described in more detail herein below, and to electronics in the elongate unit 104, for example, one or more light-emitting devices (LEDs) 120 and accompanying controller 160, if any.

The IMU 108 (e.g., sensor BNO055 from Bosch) may include one or more accelerometers 172 for acceleration detection, one or more gyroscopes 174 for force and movement detection, and a magnetometer for geographic orientation. The GR device mat include one or more IMUs 108, which may be in the base unit 102, the elongate unit 104, or in both the primary and elongate units. The IMU may include a processor 170 that determines from sensor data magnitude and direction of motion in up to three spatial axes, three rotational axes, and three geospatial orientation axes, or other useful metric for determining pattern of movement and the associated gestures, using any desired coordinate system (e.g., Cartesian or spherical) and any useful sampling interval, such as for example, 0.1 to 100 milliseconds. The IMU 108 may output other useful information, for example, its geospatial orientation. When the wand 100 is moved in space to perform a gesture, data from the accelerometer, the gyroscope and/or the magnetometer of the IMU 108 is processed by the processor 130 to detect the pattern of movements, identify the gesture and associate it with an action to be performed by a connected device. As described in more details herein, the processor 130 may access local or remote data structures and servers to complete identification of the gesture and selection of an appropriate associated action. The processor 130 may execute the identified action (e.g., illuminating LED 120 with a specific color or emitting a predetermined sound from an audio transducer 138, 166), cause instructions to be sent to a connected device, or both.

The controller 106 may include a processor 130 coupled to a random access memory (RAM) 156 holding program instructions and data for rapid execution or processing by the processor during operation. When the apparatus 100 is powered off or in an inactive state, program instructions and data may be stored in a long-term memory, for example, a non-volatile magnetic, optical, or electronic memory storage device 157. Either or both of the RAM 156 or the storage device 157 may comprise a non-transitory computer-readable medium holding program instructions, that when executed by the processor 130 cause the GR device 100 to perform operations as described herein for gesture recognition and control, alone, or in combination with one or more additional processors. The one or more additional processors may be coupled locally to the processor 130, remotely via a wireless connection, or both. Program instructions may be written in any suitable high-level language, for example, C, C++, C#, JavaScript or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. In other words, the modules may be high-level modules only.

To assist with personalization and operation of the GR device 100, the controller 106 may be attached to various other input and output devices, arranged with it on a module circuit board 107 and/or elsewhere in the GR device 100, for example arranged onto a single circuit board within the GR device 100. For example, the controller 106 may be attached to a microphone 132 to receive voice commands, and an audio transducer (e.g., a speaker or piezoelectric device) for audio output. The controller 106 may include a graphics or text processing unit 142 providing a signal for controlling output of an electronic text or graphic display 101. The display 101 may be integrated with the base unit 102 or may be provided in an auxiliary device (e.g., a smartphone) that couples to the processor 130 via one or more wireless transceivers 146, 150. The transceivers 146, 150 may support one or more protocols, for example 5G, Bluetooth, NFC or WiFi. The display 101 may display text, picture or video animations based on a gesture input. The processor 130 and memory 156 may be configured with one or more modules for speech to text conversion, gesture to speech conversion, or gesture to text conversion. In an alternative, the display 101 may be used as a user interface for configuring the GR device. The controller may include a motion controller 152 for driving an electric motor of a rotational, vibrational, or pulsating feature installed near an externally-facing surface, e.g., at block 116 in base unit 102. The controller 106 may include an ambient light sensor 134 to detect ambient light levels, a skin conductance sensor 136 for biometric sensing, a proximity detector 148 to detect when the device is in proximity of other connected devices, an RFID sensor 140 for reading identifiers from an RFID device 168 of the elongate unit 104 or other device, a particle (e.g. smoke or vapor) emitter for special effects, and a geolocating device (GPS) receiver 154.

It may be advantageous to locate certain sensors or output devices at, on or near an external surface of the GR device 100, for example at block 114 (Auxiliary 1). Suitable devices located may include, for example, a biometric sensor such as an electrode array to detect heart rate of the user, a thermistor to detect skin temperature, the skin conductance sensor 136, the particle emitter 144, a scent detector or emitter, a fingerprint reader for user authentication, and/or a heating element to enable the device to heat or cool based on gesture input.

In various embodiments, an ancillary controller 160 may be used to augment capabilities of the primary controller. As illustrated, the ancillary controller includes a processor 162 and memory 164 holding program instructions for controlling one or more LEDs 120 and an ancillary audio transducer 166. The controller may include an ID device 168 for positively identifying the model and serial number of the elongate unit 104, in support of interchangeable variety in program functions and system security. The controller 160 may include any one or more devices and sensors described in connection with 106, for example, a second IMU. Separated IMUs in the base and elongate units 102, 104 may be useful for more sophisticated gesture recognition, especially for flexible GR devices. For example, a glove configured as a GR device with multiple IMUs to capture motion of each separately movable part of a hand may be used to detect the full complexity of human language (e.g., American Sign Language). In embodiments, the 162 and memory 164 may be omitted, and local processing may be implemented only in the base unit 102, e.g., processor 130.

Before describing more technical features of the GR device and related systems and methods, applications for gesture recognition by a GR device will be described, in context of a connected environment 200 as shown in FIG. 2.

In an aspect, a GR device 100 may be configured as an Internet of Things (IoT) device, for example, a camera 101 or a light control module 203 may be controlled by the GR device 100. The GR device 100 may be configured to activate other connected devices based on gestures and/or voice commands of a user 99. For example, gestures can be used control lights, fans, air conditioners, toasters, refrigerators, doors, garage doors, cars, vacuum cleaners and other home appliances. In some implementations, the CR device can directly interact with another IoT device. However, in other implementations, the GR device may be configured to interact with other IoT devices through an intermediary system such as, for example, Google Home, Alexa, or other IoT hub.

In another application, a GR device may be configured to interact with a variety of toys 211, 213 (e.g., balls, cars, vehicles, dolls, robots, etc.) For example, gestures by the user 99 holding the GR device 100 may be used to control movement of a vehicle, a ball, or a figure (e.g., doll or robot). The toys may be configured as IoT devices, or as wireless devices configured for direct connection to the GR device or indirect connection through an auxiliary device(s).

In other applications, a GR device 100 may be used to provide a variety of augmented reality (AR) or virtual reality (VR) experiences 209. Gestures may be used to control virtual objects in a VR environment, for example, by communicating gestures detected by the GR device 100 to a VR device worn by the user to control one or more virtual objects. Gestures may also be used to control virtual objects in an AR environment. In this scenario, one or more virtual objects can be overlaid over objects in the real world (e.g., a virtual ball/feather is placed on a table in the real world). The gestures detected by the GR device 100 may be communicated to the AR device 209 worn by the user to control one or more virtual objects.

A GR device may be used to enhance entertainment presented over a television 205, notepad computer 209, projector 207, or other content delivery device. For example, gestures made with the GR device may be used to interact with real and/or virtual objects or projected images to unlock additional content and/or bonus features (e.g., additional scenes, making of the scene, etc.) in an entertainment setting (e.g., at a theater/a theme park/cruise ship/some other entertainment setting). Gestures with the GR device may be used to enhance the experience of watching a movie or playing a game. For example, gestures can be used to add content to a scene when watching a movie or a game. As another example, gestures can be used to control the narrative of a movie. The device can light-up, vibrate and/or buzz at climactic movements while watching a movie or a show.

In the area of retail sales, a GR device 100 may be configured to identify an item selected by the customer using gesture control. If the item is wearable (e.g., clothing, footwear, headwear, accessory, or the like) a retail experience system in communication with the GR device 100 may be further configured to display or project an image of the customer wearing the selected item in the customer's size based, on a gesture made by the GR device 100. The image can be displayed on a display device (e.g., a smart phone, a smart mirror, a computer, a smart pad, etc.) or projected in the ambient environment. The customer can use gesture control to change the size and/or color of the selected item of clothing/shoe. The customer can perform another gesture to buy the selected item of clothing/shoe. The selected item of clothing/shoe can be delivered to a preferred location of the customer.

For social applications, a GR device 100 may be personalized to the user. For example, a GR device 100 may be configured to recognize the user's biometric/voice and retrieve personal information associated with user (e.g., name, birthday, affiliations, preferences, and so forth). As another example, a GR device 100 can provide a unique user identifier to a user recognition system which can further retrieve personal information associated with user (e.g., name, birthday, affiliations, preferences, and so forth). The retrieved personal information can be used to recognize the user at theme parks, retail locations, theaters, or other venues; keep track of rewards, offer redemption of rewards, provide personalized service, customize offers, or other communication actions. Personal information retrieved with permission via a user's GR device can be used to greet the user upon entry into a space, alter the colors or other decorations of the space to reflect the user's affiliations/preferences. The retrieved personal information can also include a list of the user's friends or other people associated with one or more social groups that the user belongs to. The GR device may be configured to receive information of the user's friends or other people associated with one or more social groups that the user belongs to in the user's vicinity and alert the user to their presence to facilitate social interaction. Further to enhance social communication, a GR device may be equipped with gesture to speech conversion or gesture to text conversion capabilities. Accordingly, a GR device may facilitate communication between individuals who don't speak the same language. These capabilities can also be beneficial to individuals with disabilities. As a geospatial locating device, a GR device may be used as, or as part of, a navigation instrument capable of providing turn by turn directions from origin to destination to a user.

A GR device may be used to enhance a consumer experience at a retail location and encourage sales. In an illustrative application, a user is notified via an application (e.g., a magic/fantasy app) on a personal smart device (e.g., an Android device, iPhone, etc.) that he/she is now eligible to purchase an item (e.g., a special robe, a special toy, an accessory, etc.) from a retail location. The user's arrival at the retail location may be communicated by the application on the user's personal smart device to a user arrival notification system located in the vicinity of entrance of the retail location. Thus, when the user arrives at the retail location, a retail greeting system or the application may welcome the user with a personalized greeting. The personalized greeting may include, for example, the user's name, the name of the item they wish to purchase, the area of the retail location where the item is stored, and other pertinent information.

The user arrival notification system may be a part of a smart retail infrastructure 300, illustrated in FIG. 3. The user arrival notification system can include a communication system configured to receive information from the application on the user's personal smart device. An implementation of a smart retail infrastructure is described below. In some implementations, the smart retail infrastructure may receive some or all the relevant user information from the application on the user's personal smart device at the time of receiving the user's arrival information. For example, the smart retail infrastructure may receive some or all the relevant user information from one or more databases (e.g., databases located in the cloud). The relevant user information may be retrieved from the cloud based on information received from the application on the user's personal smart device.

At the retail location, the user may be provided with a generic wand (e.g. GR device 100) if the user doesn't already have a personal wand of their own. The wand can be configured to guide the user to the location where the item to purchase is located. For example, the wand may vibrate or illuminate when the user points the wand in the direction of the location of the item to purchase. The wand may be used in conjunction with a map of the retail location that is displayed by the application on the user's personal smart device. The wand may be configured to provide turn by turn directions to the user in the retail location to guide the user to the location of the item to purchase. The wand may be configured to buzz, vibrate, become hot/cold, light-up and/or point to guide the user to the location of the item to purchase.

Upon reaching the location of the item to purchase, the smart retail infrastructure may prompt the user try on the item for size when the item to purchase is an article of clothing, footwear, headgear, eyewear, jewelry or some other wearable accessory. The smart retail infrastructure may prompt the user via the user's personal smart device, via speakers deployed in the retail location and/or via speaker of the wand. In some implementations, the user may try on the item virtually.

In an aspect, the smart retail system may include a smart mirror 312, comprising a computer display coupled to a camera 316, and a video server 314. The smart mirror at the retail location may display an image 320 of the user 318 wearing the article of clothing, footwear, headgear, eyewear, jewelry or some other accessory 322 (headgear only shown). In another aspect, the smart mirror can be configured to detect and note the user's emotional response to the appearance in the smart mirror, for example the user's facial expression indicating satisfaction or displeasure. In some implementations, the smart mirror and/or the application on the user's personal smart device may offer size or color recommendations to the user. The size or color recommendations may be made based on the user's preference, the detected emotional response with the item being tried on and other considerations. A display or audio output of the smart mirror 312 or the application on the user's personal smart device may request the user to confirm the color and/or size of the item and perform a predetermined purchasing gesture if the user wants to purchase the item. The purchasing gesture may be detected by the GR wand and transmitted to the smart retail infrastructure directly or via the user's personal smart device. Upon receiving notification of the purchase, the smart retail infrastructure may be configured to trigger congratulatory messages (e.g., triggering a light show in the vicinity of the user, causing the wand to light up/buzz/vibrate, issue verbal confirmation of the purchase, etc.) to confirm the purchase. The user may be notified (e.g., via the smart personal device) that the item will be delivered to a preferred delivery location.

The application on the user's personal smart device may be configured to notify the user regarding the presence of friends and/or other members in the user's social groups in the retail location. The application on the user's personal smart device may display the location of the user's friends and/or other members in the user's social groups on a map. The wand in conjunction with the application on the user's personal smart device may guide the user to the location of the user's friends and/or other members in the user's social groups. The map of the retail location may reveal hidden places within the store location which are accessible to the user and his friends. Special items and/or discounts may be available to the user and his friends when the access the hidden places through the map.

The retail location may include other activities to facilitate social interaction, such as, for example, photobooth, food stalls, etc. Further details of a smart retail infrastructure 300 may include a plurality of retail locations 302, 304, and 306 connected to the smart retail infrastructure 300. Each retail location 302, 304, and 306 may be associated with a unique store identifier. Each retail location may include a plurality of connected devices, such as, for example, communication devices at the entrance and various other locations in the retail location, lights, projectors, televisions, speakers, microphones, or other connected devices. The plurality of connected devices in each retail location are a part of the smart retail infrastructure 300. The smart retail infrastructure can interface with other cloud infrastructures 308 and 310.

The smart retail infrastructure 300 may include information regarding the capabilities of the various connected devices in each retail location. Accordingly, the smart retail infrastructure can customize the user experience in each retail location based on the capabilities of the various connected devices in each retail location.

For example, if a retail location 306 does not have a smart mirror, then the smart retail infrastructure may prompt the user to use his/her personal smart device to virtually try on the item to purchase. As another example, if the lights in the retail location 304 are not capable of changing colors, then the smart retail infrastructure may not use the light effects in creating user's retail experience.

In some implementations, each retail location may be provided with edge computing device or server 330. In such implementations, the capabilities of the various connected devices in the retail location may be stored at the edge of the smart retail infrastructure within the edge computing device 330. A central processor 340 of the smart retail infrastructure may create a user experience that is common to all the retail location assuming full capabilities of the various connected devices. Individual edge computing devices may tailor the user experience for the individual retail location based on the capabilities of the connected devices.

Figure 4:
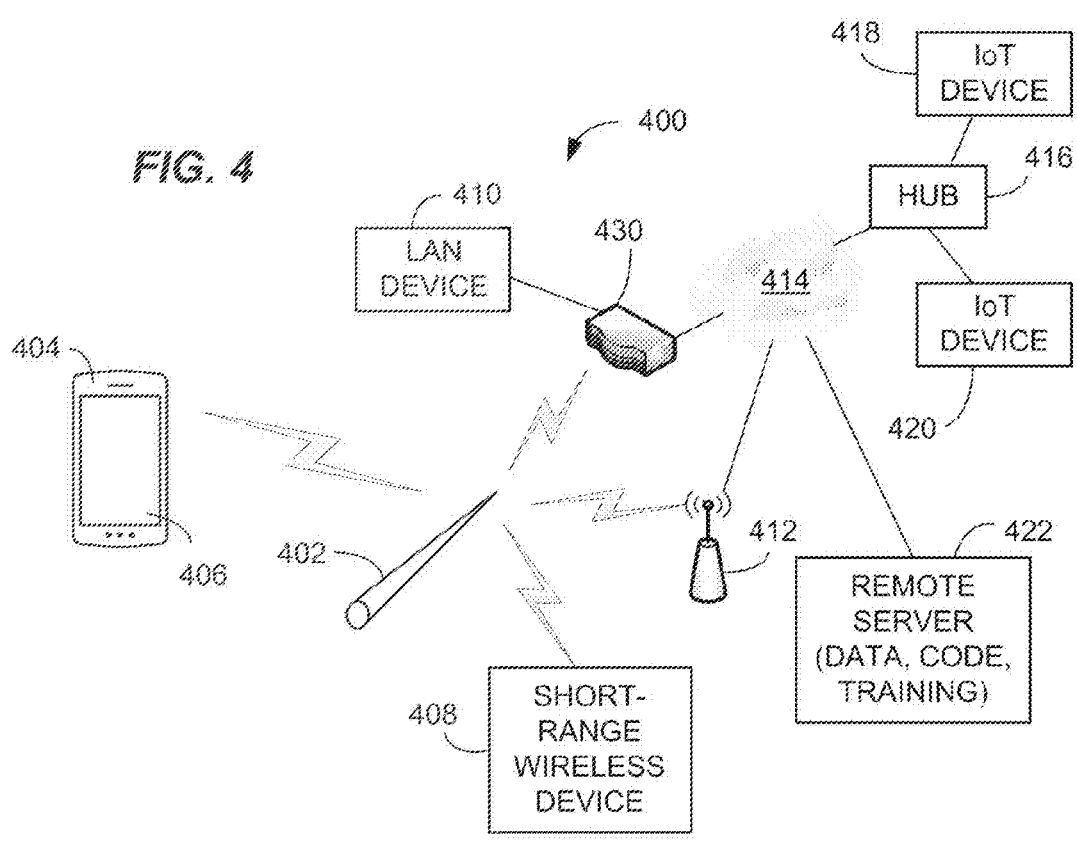
FIG. 4 is a system diagram illustrating hardware components of a system for providing a personalized experience, including a GR device.

FIG. 4 shows additional components and aspects of a gesture recognition system 400 for use with applications described herein, for interacting with a GR device 402, which may be the same as or similar to the GR device 100 previously described. The system may include a smartphone 404 with touch screen display 405 in wireless communication with the GR device 402. The GR device 402 may communicate with local connected devices, e.g., LAN client device 410, via a router 430. The GR device may communicate with a short-range wireless (e.g., Bluetooth) client device 408 via a peer-to-peer wireless link. The GR device 402 may communicate with wide area network (WAN) IoT clients 418, 420 via a hub server 416 (or without the hub, as applicable), WAN 414 and router 430 or wireless access point 412. Likewise, the GR device 402 may connect with one or more remote servers 422, that may provide resources for gesture recognition, for example, library data, or code execution for gesture recognition or gesture recognition training. For example, a remote server 422 may classify gestures by type and associate the action identifiers and gesture types, while characterizing a movement pattern as digital data is done by a processor of the GR device. In various implementations, the GR device may initiate the first step in a gesture recognition process-converting a gesture into a wireless, machine-readable signal that can be characterized by type-without performing later operations in a chain of causation between a gesture by the user and an action by a target device. In other embodiments, the GR device may perform later operations in the chain of causation.

Figure 5:
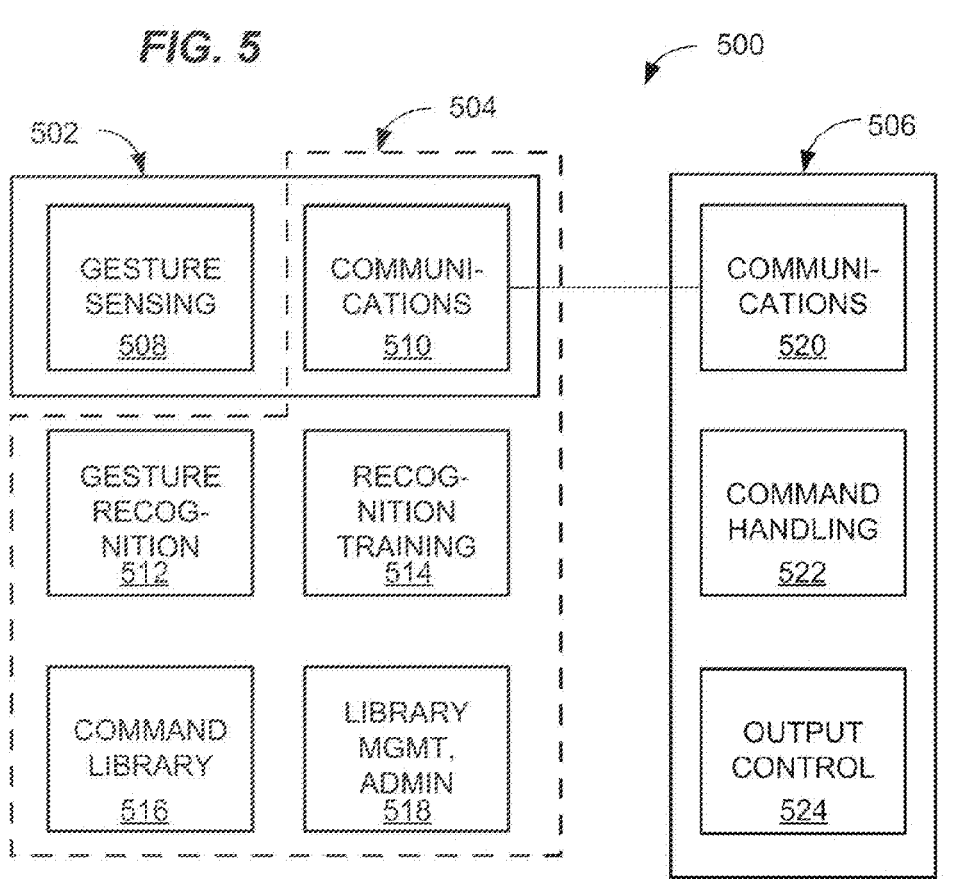
FIG. 5 is a block diagram illustrating programmable components of a system for providing a personalized experience, including a GR device.

FIG. 5 shows programmable components of a GR system 500 for providing a personalized experience, including a GR device. Block 502 encompasses critical components of a GR device for local execution. Dashed block 504 encompasses components that may be executed by a remote server, by the GR device, or both. Block 506 encompasses components of a connected device that performs an action determine by the GR system 500, for example connected clients as described in connection with FIG. 2. Gesture sensing 508 is performed locally by sensors and at least one signal processor of the GR device, as the user moves the GR device in space. As used herein, gesture sensing can refer to the detection of pattern of movements. The GR device and remote server, if any, may include a communication module 510 for communicating data and instructions with each other and with the connected client 506 via its communication module 520, which may be, or may include, for example, a standard IoT interface. The GR device 502 and/or remote server 504 may include a gesture recognition module 512 that classifies certain patterns of movement into specific categories, also called types or gestures. The GR device 502 and/or remote server 504 may further include a command library or data structure module 516 that associates gestures with action identifiers (e.g., commands).

The GR device 502 and/or remote server 504 may further include a training module 514 for configuring new patterns of movement as gestures to be recognized by the system 500. Thus, a user may configure their own gestures and expand their gesture libraries. The GR device 502 and/or remote server 504 may further include an administration and management module 518 for adding, deleting, and editing entries in their command library. Thus, a user or administrator may manage and alter library content for changing circumstances and needs.

A client device 506, also called a target or target device, need only be capable of receiving a command via a communications module 520, processing the command signal by an information processing (including command handling) module 522, and controlling its output accordingly via an output control module 524. Communications protocols used by the client 506 may be standard protocols, e.g. IoT, Bluetooth, so connection with any device capable of connecting via a common protocol is possible.

Figure 6:
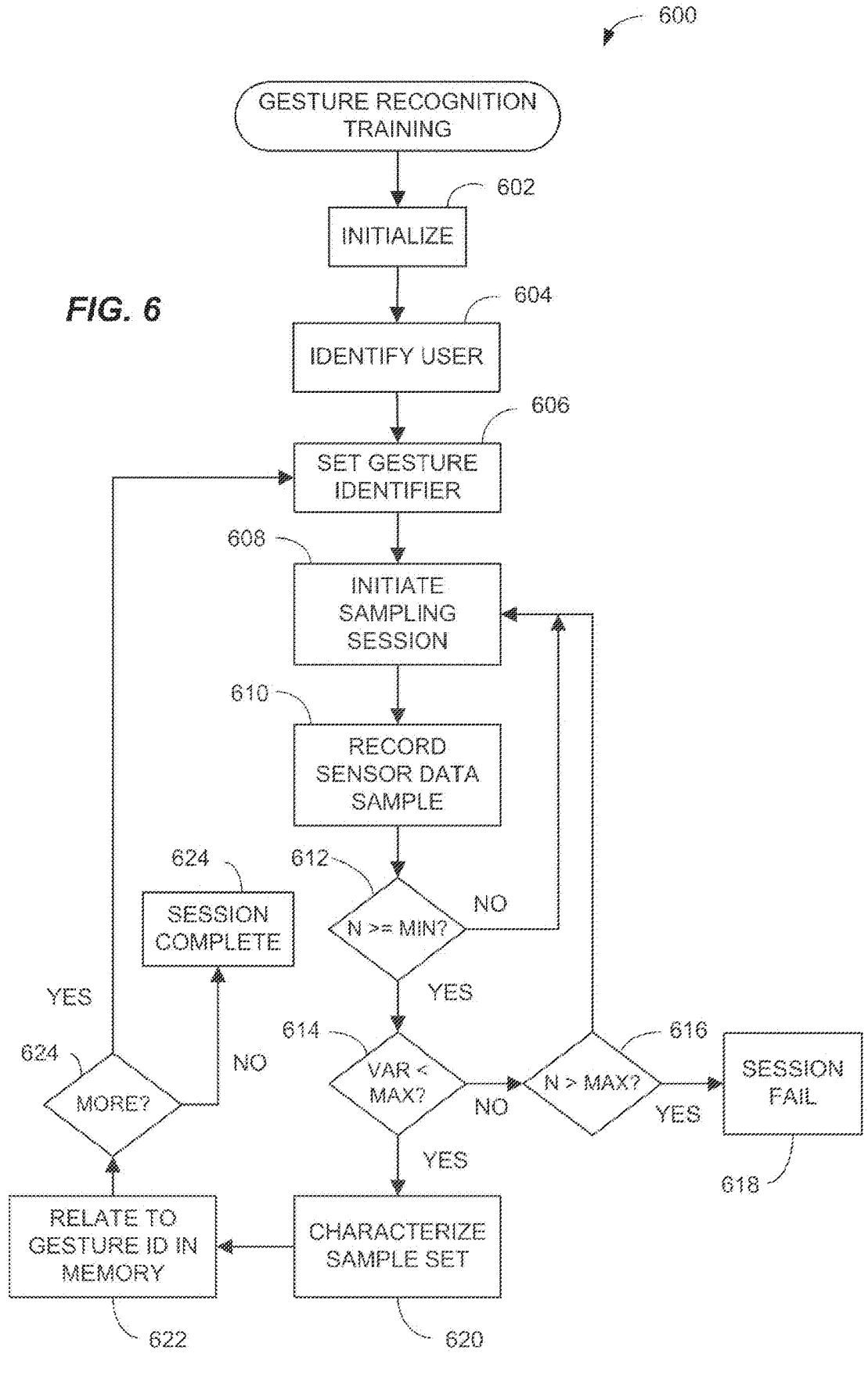
FIG. 6 is a flow chart illustrating aspects of gesture recognition training for use in or with a GR device.

Before a GR system (e.g., system 500) can recognize a pattern of movements, it may need to be programmed or trained to do so. Rules-based algorithms for pattern recognition may be programmed manually or semi-automatically, while heuristic algorithms (e.g., neural networks) may be trained using training sets. In both cases, an envelope for each gesture is defined. Gestures that fall within the envelope are classified (recognized) while those that fall outside the envelope are not classified (unrecognized). FIG. 6 shows aspects of gesture recognition training method 600 for use in or with a GR device and/or system 100, 402, 500. Gestures may be personalized for each user or user cohort, standardized for all users, or defined by both standard and personalized factors.

At 602, a processor initializes a training session, for example, in response to user or system input requesting training for a new or existing gesture. At 604, the processor may identify the user of the GR device, which may determine which gesture library the gesture belongs to. At 608, the processor may initiate a sampling session, for example, immediately after causing the GR device to emit an audible tone indicating training is to begin. At 610, the processor records motion sensor data for an interval of time, or until motion ceases, depending on the type of gesture. At 612, the processor determines whether a number of recorded samples 'N' is greater or equal to a minimum number of samples. If N is less than a minimum needed to characterize a gesture envelope, the processor reverts to record another sample at 608. If N is not less than a minimum, then the processor at 614 determines whether variance between recorded samples is less than a threshold of maximum acceptable variability. If variability is too high and the number of samples recorded exceeds a maximum number at 616, the training session fails at 618. If variability is too high and the number of samples recorded does not exceed the maximum, then the processor reverts to record another sample at 608.

If variability is within acceptable limits at 614, then the processor characterizes the sample set for the gesture at 620. For a rules-based recognition algorithm, a sample may be characterized using statistical tools, for example, mean and standard deviation, in comparing motion values across comparable intervals of time. For heuristic algorithms, a neural network or other heuristic process receives feedback from the user regarding acceptable and unacceptable sample gestures until it can accurately predict whether a motion pattern qualifies as a gesture.

At 622, the processor relates the data characterizing the gesture envelope (e.g., statistical ranges or parameters of a heuristic machine) to the identifier determined at 606 in computer memory, for example, in a library database. At 624, if the user wishes to train the system for another gesture, the processor reverts to block 606 for a new identifier. Otherwise, the processor completes the session at 624, for example by signaling the user and/or other devices in the system that the training session is complete.

Figure 7:
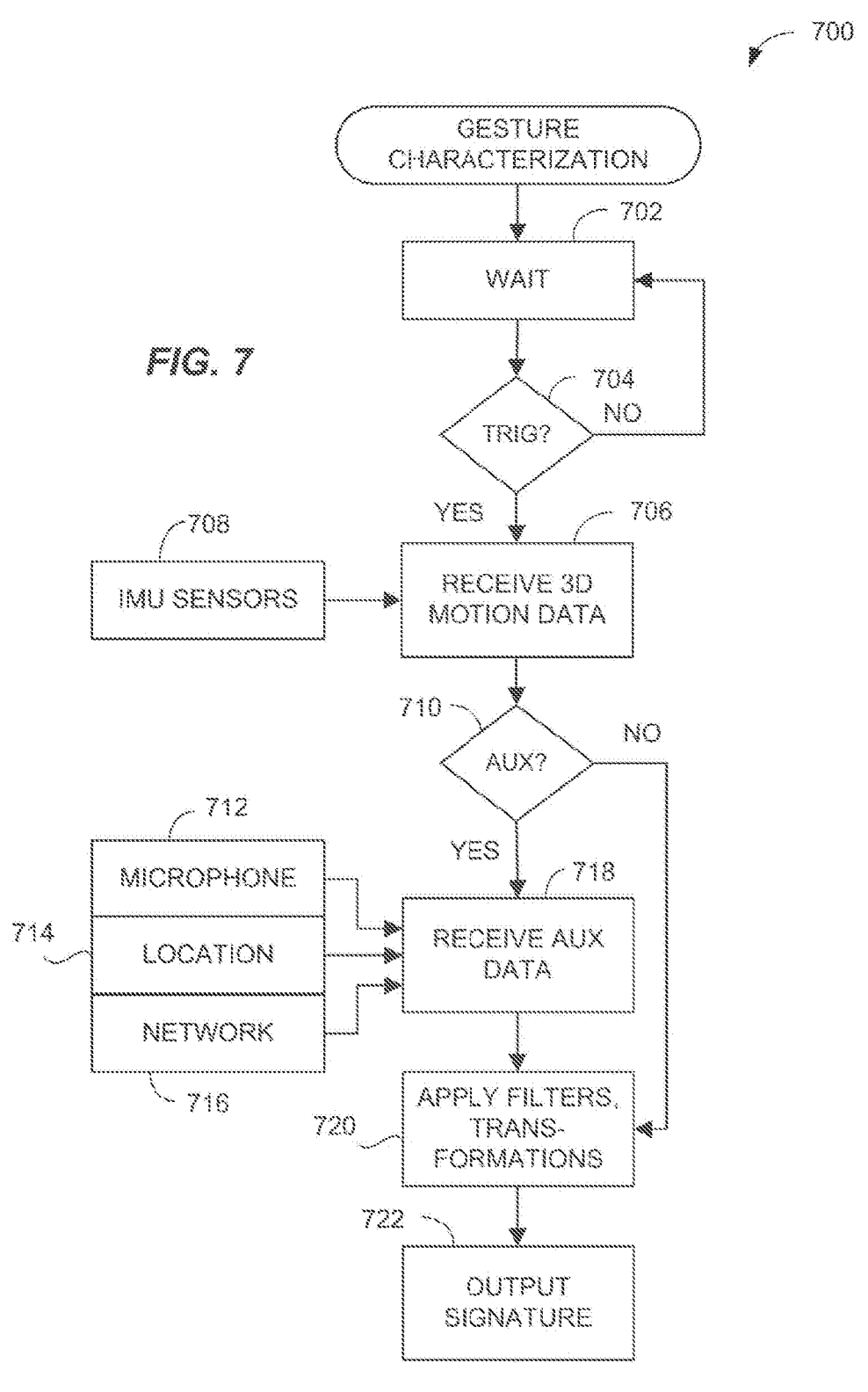
FIG. 7 is a flow chart illustrating aspects of characterizing a data signature for use in or with a GR device.

FIG. 7 shows aspects of a method 700 for characterizing a data signature for use in or with a GR device. The method may be used whenever desired to receive and recognize gesture input for applications as described herein. At 702, the processor waits for gesture input to begin. To avoid wasting processor resources, a user may deactivate the GR device's sensing capability when not needed, to prevent continual processing of random movement data. Thus, a trigger for gesture sensing may include a manual activation of the sensing function coupled with movement of the GR device. Manual activation may include, for example, receiving a spoken command, e.g., "abracadabra!" from the user. At 704, the processor waits until a trigger is received. Once the trigger is received, at 705 the processor receives 3D motion data from one or more IMU sensors. The data may include 3 spatial, 3 rotational, and 3 geospatial orientation axes as previously described, or some lesser subset of these 9 axes.

At 710, the processor determines whether any auxiliary data (e.g., a verbal command, or other input) is to be included as input to defining the gesture signature. This may be determined, for example, based on user preferences or other definition of data making up gesture input. Auxiliary data from a local microphone 712 may be used to supply a verbal component, such as a word or sound that included as part of the gesture. A location sensor 714 or example a GPS sensor, may be used to provide location data to constrain operation of the gesture to the present location. A network sensor 716 may similarly be used to provide network address data to constrain operation of the gesture to definite nodes of a network. Gesture definition is not limited by these examples. At 718, the processor receives the auxiliary data contemporaneously with receiving the motion data 706, or a short interval before or afterwards. At 720, the processor applies filers and transformations (e.g., Fourier transforms) to efficiently encode the gesture data for later recognition. An encoded gesture may be referred to herein as a "signature" or "gesture signature." At 722, the processor outputs the signature for downstream processing.

Figure 8A:
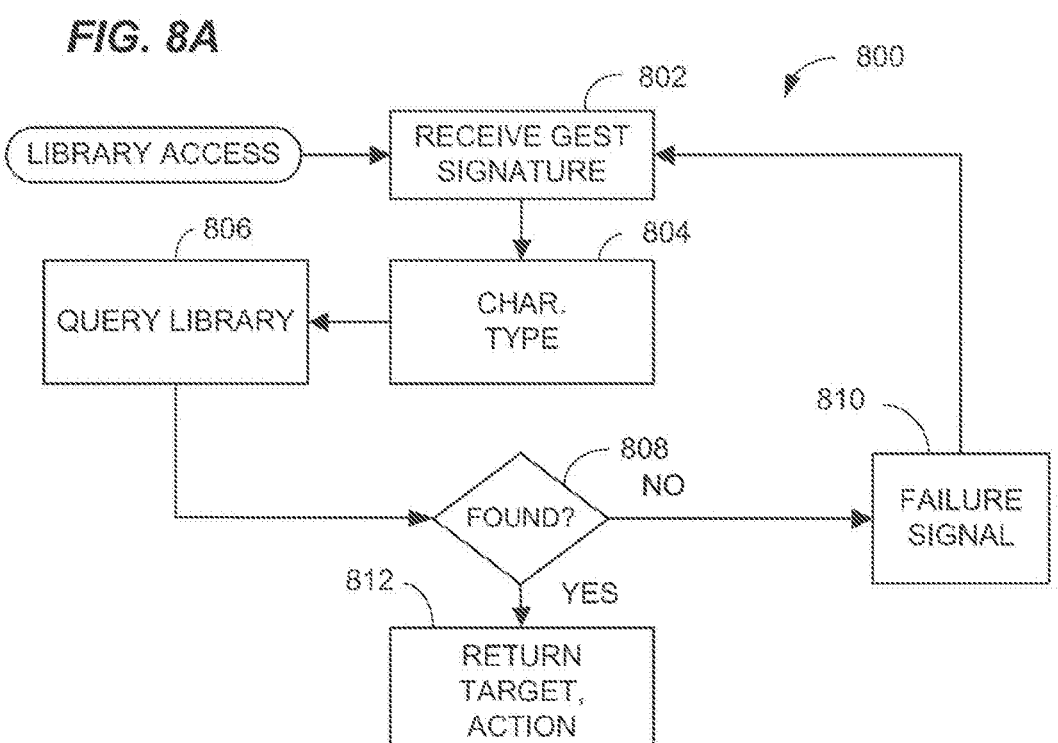
FIG. 8A-B are flow charts illustrating aspects of accessing a library of gesture-action associations and recognizing a gesture type.
Figure 8B:
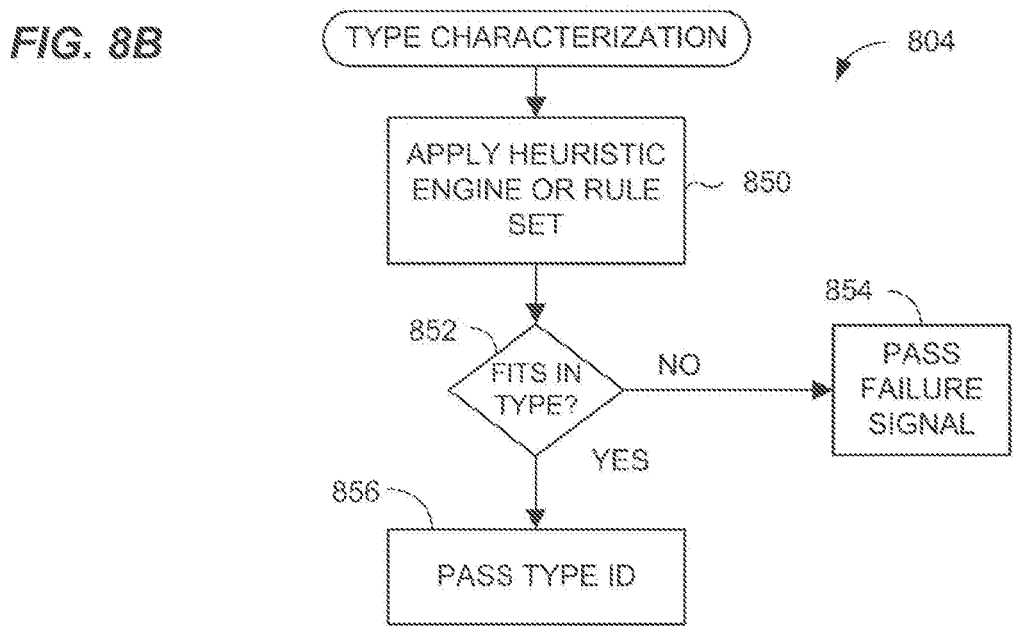

FIG. 8A-B show aspects of a method 800 for accessing a library of gesture-action associations and a related method 804 for recognizing a gesture type. At 802, a processor of a GR device or system receives a gesture signature. At 804, the processor classifies the character as a type, or as unclassifiable. At 806, the processor queries the user's gesture library by gesture type. If the gesture type is in the library at 808, the processor returns at 812 an identifier for a target client or clients and an identifier for at least one action associated with the gesture type, for use in controlling the targeted client or clients. If the gesture type does not exist in the library, or if the gesture is not classified, then the processor may provide a failure signal at 812.

FIG. 8B shows further details of gesture classification 804. At 850, the processor applies one or both of a heuristic or rules-based classification engine to the gesture signature. If using a heuristic algorithm, the processor may retrieve parameters for a heuristic engine trained on the user's gestures, populate the engine with the parameters, and process the signature using the populated engine. For a rules-based algorithm, the processor may select a class with the best fit across multiple measures of the movement (e.g., velocity, direction, acceleration, rotation, location) for each interval of time, and determine, for the best-fitting class, whether the fit satisfies a minimum threshold of similarity. At 852, if the signature fits within a type, the processor may pass the type identifier; otherwise, it may pass a failure signal at 854.

Figures 9, 10:
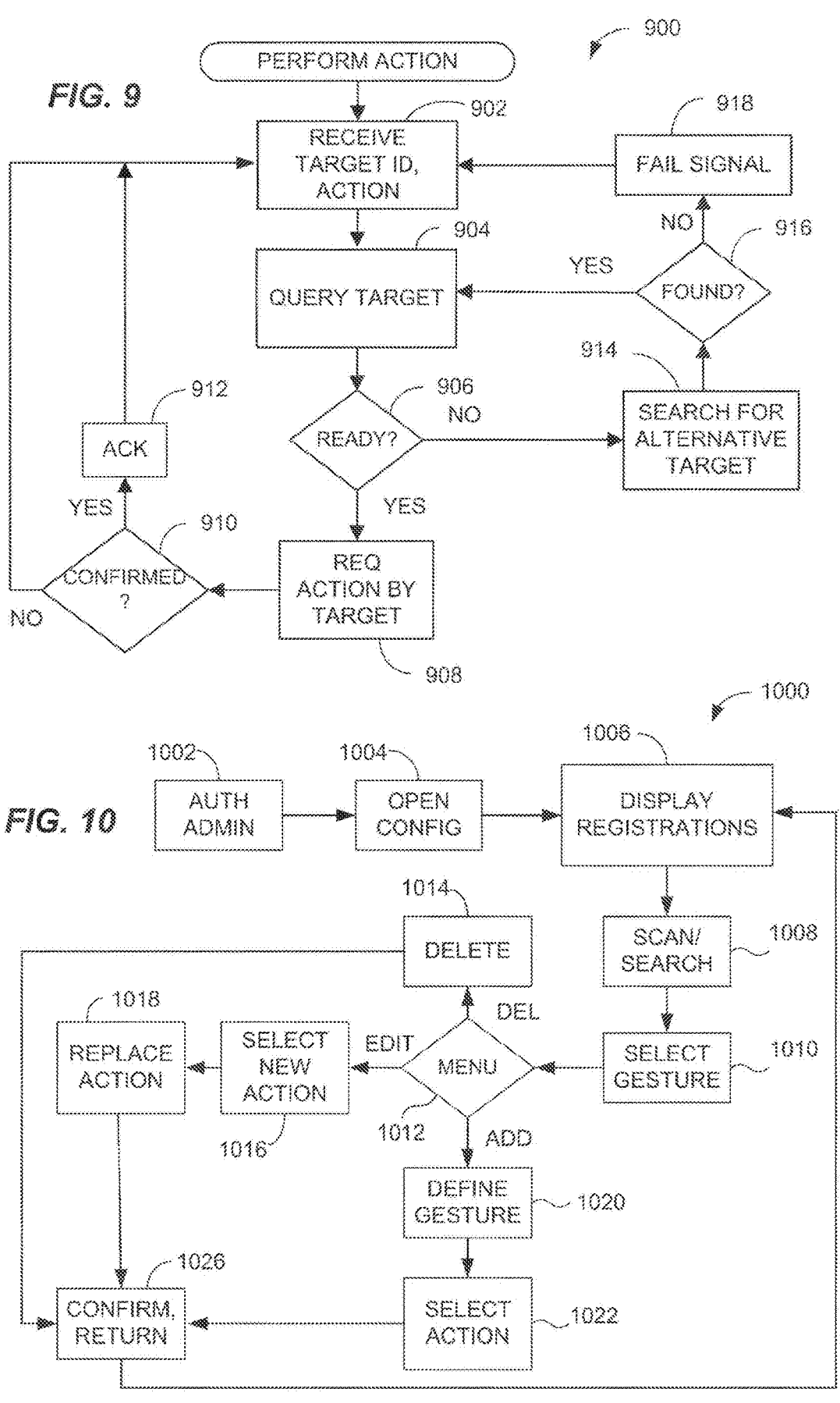
FIG. 9 is a flow chart illustrating aspects of performing an action specified by a gesture.
FIG. 10 is a flow chart illustrating a process for building or adding a personalized gesture library for use in or with a GR device.

FIG. 9 shows aspects of a method 900 for performing an action specified by a gesture. At 902, the processor of a GR device or system may receive a target identifier and an action identifier. At 904, the processor queries the identified target using the action identifier, according to a query protocol for the target. At 906, the processor determines, based on a query response, whether the target is ready to perform the identified action. If the target is not ready, the processor may determine if an alternative or additional target is available at 914. If an additional or alternative target is available, the processor may revert to block 904, query target. If no other target is available, the processor may provide a fail signal at 918 and revert to 902 for the next requested action. If the target is ready at 906, the processor may request that the target perform the action at 908. At 910, the processor confirms that the action is performed, for example by receiving a signal from the target, or sensing a change in the environment caused by the action. If the performance is confirmed at 910, the GR device or system may provide an acknowledgement signal to the user, target, and/or administrative component of the GR system, and revert to block 902 for the next action. If the performance is not confirmed, the processor may revert directly to block 902.

FIG. 10 shows a process 1000 for building or adding a personalized gesture library for use in or with a GR device, such as may be performed by a administrative component of a GR system. At 1002, a processor of a GR device or system may authorize a user to edit a specified library of associations between action identifiers and gesture identifiers. At 1004, if the user passes authentication, the processor may access a configuration file specifying associations for the library. At 1006, the processor may output a display of current registrations, such as a list of gesture identifiers and associated action identifiers, using human-readable descriptions. At 1008, the processor may scan or search the configuration file to find a record requested by the user. At 1010, the processor may display a gesture returned by the search. In an alternative, the processor may omit the search 1008 and display 1010 if the user does not specify any gesture.

At 1012, the processor may present the user with a menu, including at least three possibilities: delete selected gesture, edit selected gesture, or add new gesture. If the user selects "delete," the processor may delete the gesture record at 1014, and at 1026, confirm the deletion and return to 1006 until user editing is finished.

If the user selects "edit," the processor may enable user selection of a new action and/or target, at 1016. For example, the processor may present an interface enabling user selection of a target from targets available to the user, and an action from available actions for each target. At 1018 in response to a user selection, the processor may replace the prior action and/or target in the configuration record with the newly selected action and/or target. Then the processor may confirm the change at 1026 and revert to the registration display until the user editing is finished.

If the user selects "add new action" at 1012, the processor may define a new gesture at 1020, for example, using the method 600 described in connection with FIG. 6. At 1022, the processor may enable user selection of any available action and/or target, for example as described in connection with block 1016. At 1026, the processor may confirm the change at 1026 and revert to 1006.

In accordance with an embodiment, as described above, the user may create corresponding gestures, which should not be construed to be limiting the scope of the disclosure. Notwithstanding, the disclosure may not be so limited, and in accordance with another embodiment, the gestures may be pre-programmed and stored within a gesture recognition system, that may execute within and/or in the background of an application of an external electronic device (such as a mobile device).

FIG. 11 shows a method 1100 for controlling a GR device to provide a gesture-centric user interface for controlling one or more connected devices.

In accordance with the foregoing, and by way of additional example, FIG. 11 shows more general aspects of a method or methods 1100 according to one embodiment, as may be performed by one or more processors of a GR device or system as described herein. It should be appreciated that the more general operations of method 1100 may include or embody more detailed aspects of corresponding methods described herein above.

Referring to FIG. 11, a computer-implemented method 1100 for providing a gesture-centric user interface for multiple target devices may include, at 1110, sensing motion of a GR device comprising an inertial motion sensor in three-dimensional space coupled to one or more processors.

The method 1100 may further include, at 1120, matching a pattern of the motion to a gesture identifier. The method 1100 may further include, at 1130, determining a target device and action identifier by reference to a data structure that associates each of a plurality of gesture identifiers to a user-settable action identifier and target identifier. The method 1100 may further include, at 1140, requesting the target device to perform an action identified by the action identifier The method 1100 may include any one or more additional operations as described herein above. Each of these additional operations is not necessarily performed in every embodiment of the method, and the presence of any one of the operations does not necessarily require that any other of these additional operations also be performed. For example, optionally, method 1100 may further include a method 1000 of editing a library of gesture/action associations, or a method 600 for training a processor to recognize a gesture.

Figure 12A:
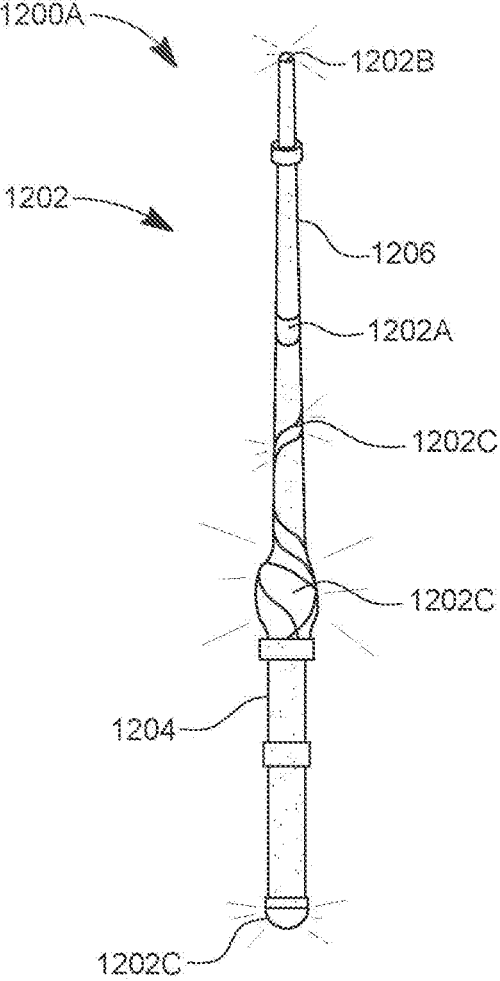
FIG. 12A is a diagram that illustrates an external view of an exemplary GR device.

FIG. 12A is a diagram that illustrates an external view of an exemplary GR device 1200, in accordance with an embodiment of the disclosure. With reference to FIG. 12A, there is shown an external view 1200A of the exemplary GR device 1200, such as an interactive wand or a smart wand. The external view 1200A depicts an outer shell 1202 that comprises a handle 1204 and a shaft 1206. The outer shell 1202 includes various portions, such as an opaque portion 1202A, a transparent portion 1202B, and/or a translucent portion 1202C, that overall provides a classic, authentic, and dynamic appearance to the exemplary GR device 1200. The handle 1204 may be grasped by the hand of the user 99, while the shaft 1206 provides a form factor of a wand tip extending outward from the handle 1204. The outer shell 1202 may be structured in such a manner that a single printed circuit board assembly (PCBA) 1208 (as illustrated and described in FIGS. 12B and 12C) may be easily slid into the outer shell 1202 and coupled thereto using a fastening mechanism, such as press-and-fit clip.

The opaque portion 1202A, that may be made up of metal, wood, blended polymer or a combination thereof, spans the majority of the outer shell 1202 of the exemplary GR device 1200 and masks the non-illuminating components of the PCBA 1208, and also adds to the aesthetic appeal of the exemplary GR device 1200. The transparent portion 1202B and the translucent portion 1202C provide an outer chassis to various illuminating components, such as multi-colour LEDs, mounted on the PCBA 1208 when the exemplary GR device 1200 is in an active state.

The transparent portion 1202B may be positioned preferably at the tip of the exemplary GR device 1200 to provide a bright illumination when the exemplary GR device 1200 is in the active state. On the other hand, the translucent portion 1202C may be positioned above the handle 1204, at the bottom, and along the length of the shaft 1206 of the exemplary GR device 1200 to provide a diffused and subtle illumination when the exemplary GR device 1200 is in the active state.

The positions of the transparent portion 1201B and the translucent portion 1201C in the outer shell 1202 may correspond to the position of the underneath illuminating components mounted on the PCBA 1208. The transparent portion 1202B and the translucent portion 1202C may illuminate in multi-colours when the user 99 activates the exemplary GR device 1200 and subsequently provides gestures to perform a specific action, such as interacting with smart devices at home, franchise locations, events, or bespoke enchanted items, thereby providing a spellcasting and magical experience to the user 99.

It may be noted that the form factor of the exemplary GR device 1200 in accordance with the external view 1200A is provided merely for exemplary purposes and should not be construed to limit the scope of the disclosure. Notwithstanding, other suitable form factors of the exemplary GR device 1200 may be possible for being held, moved through the air, worn and/or carried by movements of the extremities of the user 99. Each form factor of the exemplary GR device 1200 may define and prescribe a particular shape, size, pattern, material, and other physical specifications, without any deviation from the scope of the disclosure.

In accordance with an embodiment, the exemplary GR device 1200 may be a wireless interactive wand or a smart wand configured to communicate wirelessly via radio frequency (RF) or infrared (IR) communication mode with other devices by utilizing power generated by a power storage unit 110. In accordance with another embodiment, the exemplary GR device 1200 may be an interactive wand configured to illuminate at a plurality of sections by utilizing power generated by a power storage unit 110. In accordance with yet another embodiment, the exemplary GR device 1200 may be an interactive wand configured to generate haptic feedback by utilizing power generated by a power storage unit 110. For example, the exemplary GR device 1200 may light-up, vibrate and/or buzz at climactic movements while watching a movie or a show. In accordance with yet another embodiment, the exemplary GR device 1200 may communicate with an enchanted object, via an external electronic device (such as a mobile device), without use of a router. In certain embodiments, the external electronic device comprises a gesture recognition engine (not shown) for classifying the gestures by type and associating the action identifiers and gesture types. In other embodiments, the exemplary GR device 1200 may comprise the gesture recognition engine that may be executed by the exemplary GR device 1200 or via connection to the cloud.

Figure 12B:
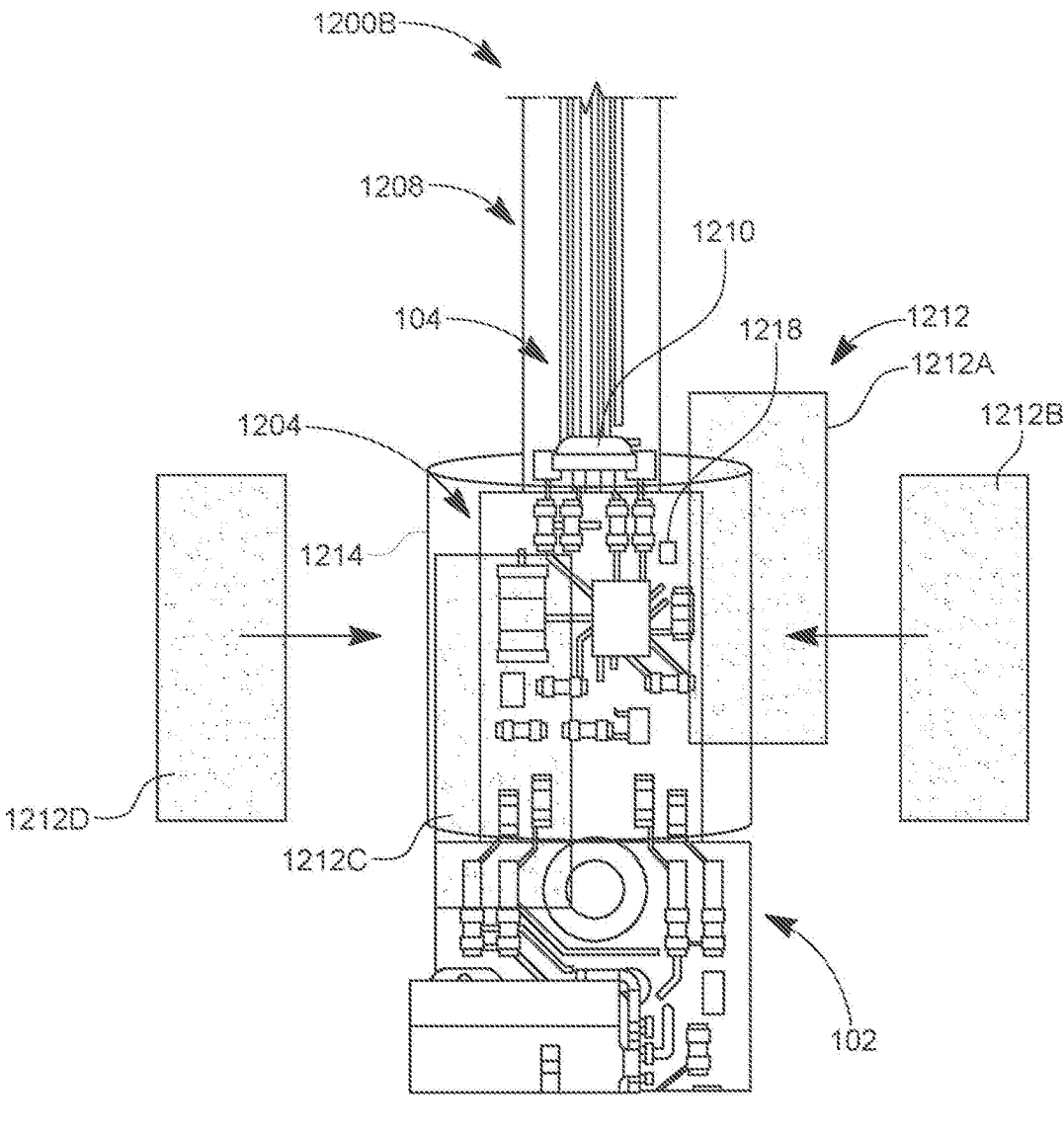
FIG. 12B is a diagram that illustrates an unassembled view of the internal circuitry, of the exemplary GR device of FIG. 12A with a capacitive touch sensor panel for detecting a multi-factor touch assertion.
Figure 12C:
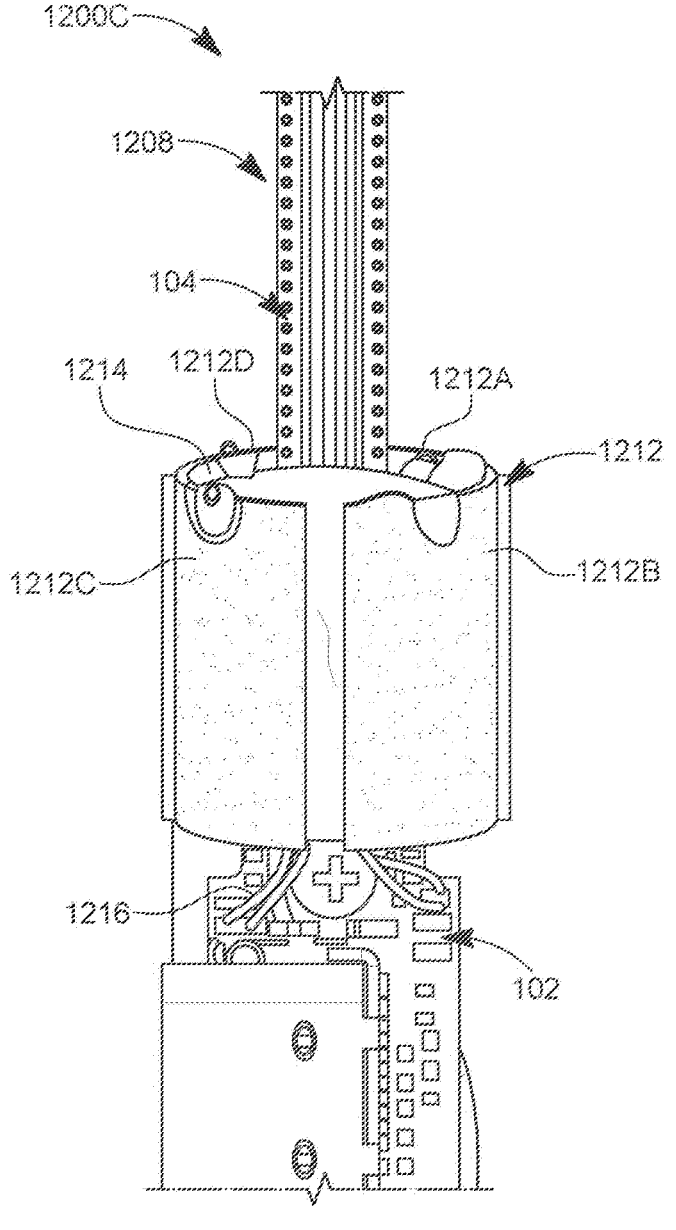
FIG. 12C is a diagram that illustrates an assembled view of the internal circuitry, of the exemplary GR device of FIG. 12A with a capacitive touch sensor panel for detecting a multi-factor touch assertion.

FIGS. 12B and 12C are diagrams illustrating two views of an internal circuitry of the exemplary GR device 1200 with a capacitive touch sensor panel for detecting a multi-factor touch assertion, in accordance with an embodiment of the disclosure. With reference to FIGS. 12B and 12C, there is shown the single PCBA 1208 that includes the base unit 102 and the elongate unit 104, as introduced in FIG. 1. For the exemplary GR device 1200 styled as an interactive and/or a smart wand, the base unit 102, upon which the handle 1204 is mounted, may be configured to be grasped by the hand of the user 99. Further, the elongate unit 104, upon which the shaft 1206 is mounted, may be configured to have a form factor of a wand tip that extends outward from the base unit 102 and provides an overall form factor to the wand. It may be noted that both the handle 1204 and the shaft 1206 form the outer shell 1202 that is mounted as a single unit on the single PCBA 1208. The single outer shell 1202 and the single PCBA 1208 are secured with each other using a locking feature, such as press-and-fit, to prevent undesired decoupling as the exemplary GR device 1200 is rapidly moved around, for example while generic handling or while providing a gesture during spellcasting by the user 99.

In some implementations, all the main electronic components of the exemplary GR device 1200, such as the controller 106, the power storage unit 110 (such as battery), the IMU 108, the RFID sensor, and infrared (IR) sensors, may be mounted on the base unit 102. On the other hand, the elongate unit 104 includes minimal number of electronic components, such as LEDs (for example LED 1210) with associated capacitors and registers. Such a distribution of the electronic components frees up the space on the elongate unit 104. Consequently, the elongate unit 104 is less likely to bend, distort, and flex around when the exemplary GR device 1200 is moved rapidly by the user 99. It may be noted that, for the sake of brevity, such components are not shown in FIGS. 12B and 12C, as they have been already described in detail in FIG. 1.

In addition to the aforesaid electronic components, FIGS. 12B and 12C further illustrate two views, i.e. an unassembled view 1200B and an assembled view 1200C, of the internal circuitry, i.e. the single PCBA 1208, of the exemplary GR device 1200, in accordance with an embodiment of the disclosure. The single PCBA 1208 further comprises a capacitive touch sensor panel 1212 for detecting a multi-factor touch assertion. The capacitive touch sensor panel 1212 may include a plurality of sensing pads, such as a first sensing pad 1212A, a second sensing pad 1212B, a third sensing pad 1212C, and a fourth sensing pad 1212D, that may be arranged in a cylindrical pattern inside the handle 1204 of the exemplary GR device 1200. In an exemplary scenario, each of the plurality of sensing pads may be based on capacitive coupling that is realized based on energy transfer within an electrical network (or between distant networks) by means of a displacement current between nodes of a circuit nodes, induced by the electric field. Each of the plurality of sensing pads may be configured to detect anything that is conductive or has a dielectric different from air. For example, the human body (i.e. the digits of the fingers of the hand) may be used as an electrical charge conductor when the user 99 holds the exemplary GR device 1200 in accordance with a plurality of grip techniques, as described in FIGS. 14A to 14D.

It may be noted that, based on experimental data, the number of sensing pads in the capacitive touch sensor panel 1212 are depicted and described as four to offer optimum granularity at optimum cost. In a use case, the number of sensing pads may be lesser than four. However, lesser number of sensing pads may offer more false positives thus limiting the performance of the exemplary GR device 1200. In accordance with an embodiment, the number of sensing pads may be greater than four, for example five sensing pads. In such an embodiment, the additional sensing pads may be required to be supported optimally by additional hardware, such as the controller 106 implemented as a Bluetooth system-on-chip (SoC) that incorporates Bluetooth Low-Energy (BLE) with an embedded Bluetooth radio, to increase the number of I/O units and sensing channels/lines.

In the context of the present disclosure, one or more digits or fingers of the hand of the user 99 placed near or on a set of sensing pads (from the plurality of sensing pads) in accordance with a specific grip technique, asserts the set of sensing pads. The user 99 may place one or more digits or fingers of the hand of the user 99 near or on a set of sensing pads to hold the exemplary GR device 1200 in accordance with one of a plurality of grip techniques. The plurality of grip techniques are illustrated and described in FIGS. 14A to 14D. Based on one of the plurality of grip techniques, corresponding detection factors are determined, and consequently, the assertion signal is generated that corresponds to one or more of the three detection factors. Such multi-factor touch assertion validates that the exemplary GR device 1200 is ready and actually asserted, thus inferring the intent of the user 99 to cast a spell, i.e., perform a gesture in the connected environment 200 (as described in FIG. 2) based on a pre-defined gesture and/or voice commands. In one example, using the exemplary GR device 1200, the user 99 may interact with other IoT devices through an intermediary system such as, for example, Google Home®, Alexa®, or other IoT hub. In another example, the user 99 may control virtual objects in a AR or VR environment, and interact with real and/or virtual objects or projected images to unlock additional content and/or bonus features in an entertainment setting.

In accordance with an embodiment, as shown in FIGS. 12B and 12C, the arrangement of the cylindrical pattern of the plurality of sensing pads is such that a longitudinal axis of each sensing pad is arranged orthogonally to a circular axis inside the handle 1204 of the exemplary GR device 1200. As illustrated, the arrangement of the cylindrical pattern of the plurality of sensing pads enables a 360-degree capacitive touch for the multi-factor touch assertion.

In accordance with an embodiment, the capacitive touch sensor panel 1212 may be integrated on a flex printed circuit board 1214 and wrapped to form a cylindrical shape within the exemplary GR device 1200. The flex printed circuit board 1214 may include printed or embedded circuits on a cable plane thereby functioning as a flexible PCB. Furthermore, the capacitive touch sensor panel 1212 may be communicatively coupled to the PCBA 1208 housing the controller 106 via a flex connector 1216. The flex connector 1216 may be made of flexible plastic, polymers, films, or engineered rubber, with a metallic connector at the end, which may be embedded in parallel to the base.

In accordance with an embodiment, each of the plurality of sensing pads, such as the first sensing pad 1212A, the second sensing pad 1212B, the third sensing pad 1212C, and the fourth sensing pad 1212D, may be communicatively coupled to a capacitive touch sensor controller 1218. The capacitive touch sensor controller 1218 may be a dedicated control unit for the capacitive touch sensor panel 1212 and may include components, such as a processor, memory holding program instructions, and radio components, for controlling and managing at least the plurality of sensing pads. In an exemplary embodiment, the capacitive touch sensor controller 1218 may be implemented as a Bluetooth system-on-chip (SoC) that incorporates Bluetooth Low-Energy (BLE) with an embedded Bluetooth radio. In accordance with one configuration, one of the capacitive touch sensor controller 1218 or the controller 106, as a standalone control unit, may be configured to perform all the operational steps, as described in FIG. 13, without any deviation from the scope of the disclosure. In accordance with an alternate configuration, the capacitive touch sensor controller 1218 and the controller 106, in conjunction with each other as an integrated control unit, may be configured to perform the operational steps, as described in FIG. 13, without any deviation from the scope of the disclosure. In accordance with another alternate configuration, the capacitive touch sensor controller 1218 the controller 106, and an external controller of an external electronic device, though not shown here for the sake of brevity, in conjunction with each other as an integrated control unit, may be configured to perform the operational steps, as described in FIG. 13, without any deviation from the scope of the disclosure.

In a use case, while operating as the integrated control unit, the capacitive touch sensor controller 1218 may serve as an ancillary control unit to perform the initial simple operational steps of transmitting driving signal to the plurality of sensing pads, activating the plurality of sensing pads, and detecting multi-factor touch assertion at a set of sensing pads from the activated plurality of sensing pads. The complex operational steps, for example, generating assertion signal, determining a signal sequence, inferring a user intent, converting a current inactive state of the GR device to an active state based on a validation of the determined signal sequence, and communication of one or more signals to an external electronic device, such as a mobile device, via a communication channel (such as radio, cellular, or a wireless communication channel) may be performed by the controller 106, thus serving as the primary control unit.

In accordance with an embodiment, the first sensing pad 1212A, the second sensing pad 1212B, the third sensing pad 1212C, and the fourth sensing pad 1212D may be activated based on the driving signals received from the capacitive touch sensor controller 1218 or directly from the controller 106. When the user 99 holds the handle 1204 in accordance with one of the plurality of grip techniques, as described in FIGS. 14A to 14D, an electrical change at a set of sensing pads, for example two opposing sensing pads, occurs that correspond to a two-factor touch assertion. The capacitive touch sensor controller 1218 or the controller 106 may further determine the location of the touch indirectly from the change in the capacitance as measured from the four corners of the corresponding sensing pad. Within a pre-defined interval, the user 99 may further provide a tap gesture or a 3D movement, that may be detected by the IMU 108 and thus, provides a three-factor touch assertion. The capacitive touch sensor controller 1218 or the controller 106 may detect the electrical change corresponding to the multi-factor touch assertion in response to an applied driving voltage. The capacitive touch sensor controller 1218 or the controller 106 may generate an assertion signal in accordance with the three detection factors corresponding to the detected multi-factor touch assertion. In accordance with various embodiments, the capacitive touch sensor controller 1218 or the controller 106 may be configured to perform further processing on the generated assertion signal.

It may be noted that, as described above and hereinafter, the multi-factor touch assertion realized based on capacitive touch technology (i.e. by the combination of the capacitive touch sensor panel 1212 and the capacitive touch sensor controller 1218 (or the controller 106)) is merely for exemplary purpose and should not be construed to limit the disclosure. Notwithstanding, apart from the capacitive touch sensors, there may be other such means, such as pressure sensors, structured in the similar manner and performing the same functionality of inferring the user intent from multi-factor touch assertion, without deviating from the scope of the disclosure.

Figure 12D:
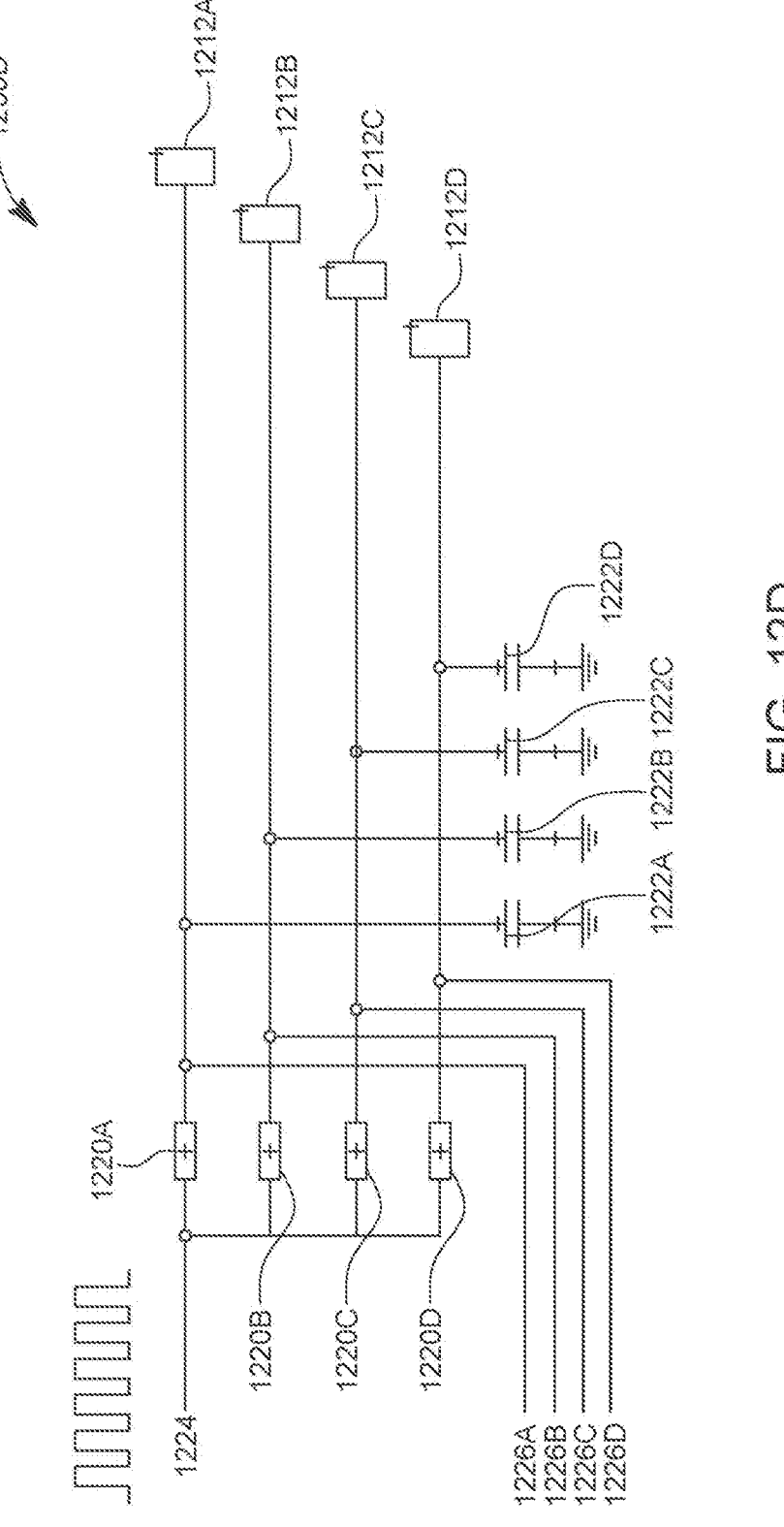
FIG. 12D is a circuit diagram of I/O drive of the capacitive touch sensor panel in the exemplary GR device.

FIG. 12D is a circuit diagram 1200D of I/O drive of the capacitive touch sensor panel 1212 in the exemplary GR device 1200. With reference to FIG. 12D, there are shown four resistors 1220A, . . . , 1220D and four capacitors 1222A, . . . , 1222D connected with the first sensing pad 1212A, the second sensing pad 1212B, the third sensing pad 1212C, and the fourth sensing pad 1212D, respectively. Also shown are the driving signal, such as the capacitive touch driving signal 1224, and four sensing lines 1226A, . . . , 1226D.

The capacitive touch driving signal 1224 is transmitted to the first sensing pad 1212A, the second sensing pad 1212B, the third sensing pad 1212C, and the fourth sensing pad 1212D, via the four resistors 1220A, . . . , 1220D, for activating the capacitive touch sensor panel 1212. For any assertion observed across a set of sensing pads, corresponding change in the capacitance levels may be communicated via corresponding sensing lines from the sensing lines 1226A, . . . 1226D, based on which assertion signal is generated by the capacitive touch sensor controller 1218 or the controller 106. Optionally, the four capacitors 1222A, . . . , 1222D may be connected across the four resistors 1220A, . . . , 1220D respectively for electromagnetic interference (EMI) filtering to filter out unwanted noise signals. It may be noted that for the sake of simplicity, the circuit diagram 1200D is illustrated herein to implement a two-factor touch assertion and without showing an assertion by the third factor.

Figure 13:
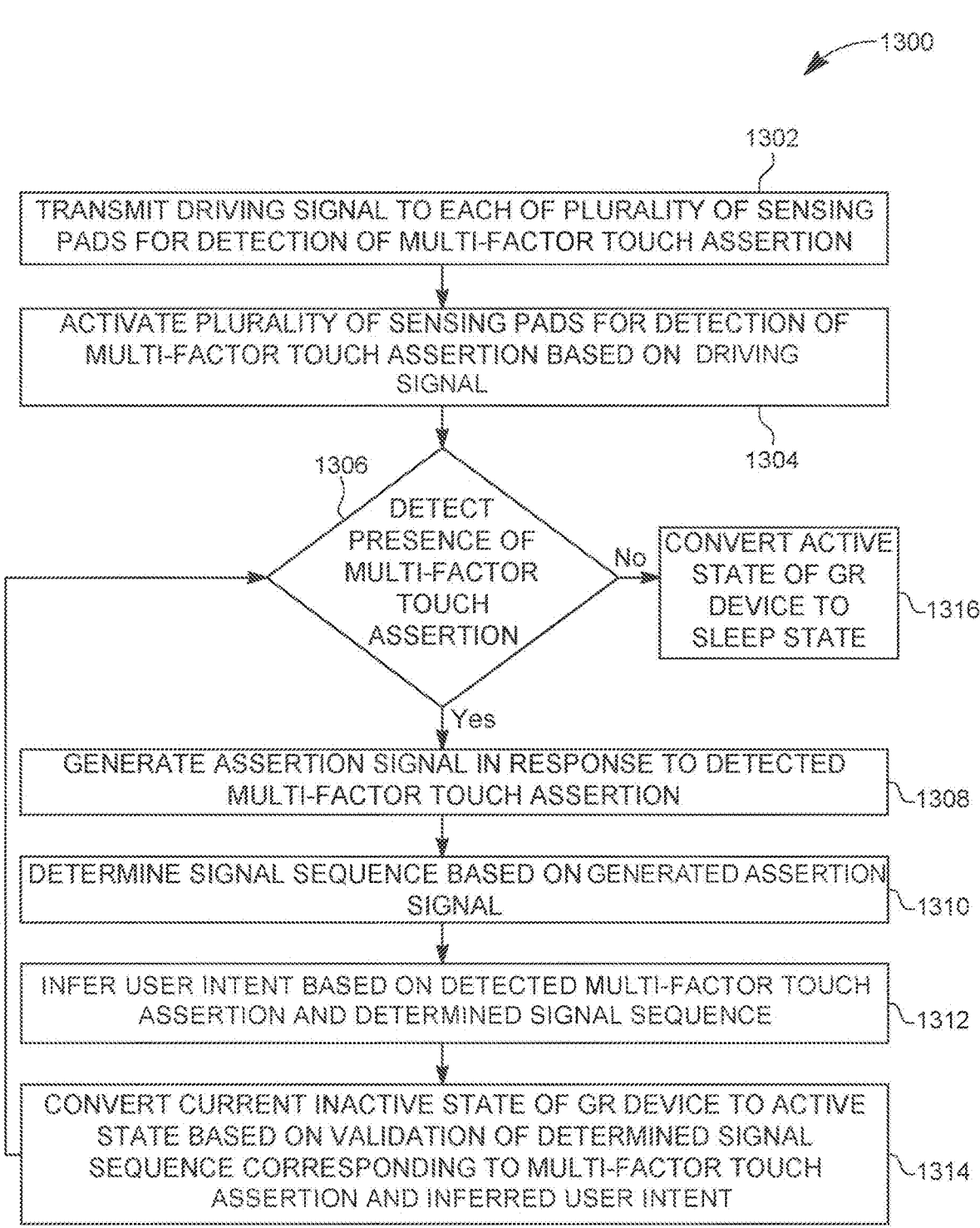
FIG. 13 is a flow chart illustrating a method for sensing multi-factor touch assertion by a GR device.

FIG. 13 is a flow chart 1300 illustrating a method for sensing multi-factor touch assertion by the exemplary GR device 1200. FIG. 13 is described in conjunction with FIGS. 14A to 14D, that are use case diagrams of the exemplary GR device 1200 illustrating various grip techniques for the multi-factor touch assertion, in accordance with various embodiments of the disclosure.

At 1302, a driving signal may be transmitted to each of the plurality of sensing pads for the detection of the multi-factor touch assertion. In accordance with an embodiment, the control unit, such as the capacitive touch sensor controller 1218 or the controller 106, may be configured to transmit the driving signal to each of the plurality of sensing pads, such as the first sensing pad 1212A, the second sensing pad 1212B, the third sensing pad 1212C, and the fourth sensing pad 1212D, for the detection of the multi-factor touch assertion.

In accordance with an embodiment, the controller 106 or the capacitive touch sensor controller 1218 may sequentially supply the driving signal, having a specific frequency, to the capacitive touch sensor panel 1212. The value of the specific frequency of the driving signal received from the controller 106 or the or the capacitive touch sensor controller 1218 has a pre-defined value. Accordingly, the capacitive touch sensor panel 1212 may be driven for detecting multiple touch inputs provided by the user 99. The driving signal applied to the capacitive touch sensor panel 1212 may include a plurality of driving pulses. For example, the driving signal may be a square wave operated from an integrated circuit's (IC's) supply voltage, e.g., 3.0V. In certain embodiments, to minimize the influence of noise in the driving pulse, the width of the driving pulse may be changed while maintaining the frequency of the driving signal. In such embodiments, the width of the driving pulse may be changed when the noise level exceeds a threshold value.

At 1304, a plurality of sensing pads may be activated based on the driving signal. In accordance with an embodiment, the control unit, such as the capacitive touch sensor controller 1218 or the controller 106, may be configured to activate the plurality of sensing pads of the capacitive touch sensor panel 1212 based on the received driving signal.

Each of the plurality of sensing pads of the capacitive touch sensor panel 1212 has a touch-sensing surface that uses an array of touch sensors to detect assertions on the surface corresponding to the touch inputs provided by the user 99. In accordance with an embodiment, each touch sensor in the array of touch sensors may receive the driving signals and may be coupled with sensing lines on a one-on-one basis through additional electronic components, i.e. resistor and a set of capacitors. The control unit, such as the capacitive touch sensor controller 1218 or the controller 106, may be configured to continuously measure the self-capacitance of each sensing pad in the capacitive touch sensor panel 1212 in the activated state.

At 1306, a multi-factor touch assertion may be detected at the set of sensing pads from the activated plurality of sensing pads. In accordance with an embodiment, the set of sensing pads may be configured to detect the multi-factor touch assertion from the activated plurality of sensing pads. The multi-factor touch assertion may be detected from the activated set of sensing pads when the self-capacitance of an electrode of the touch-sensing surface of corresponding sensing pad changes. Such a change occurs when a conductive body or material, for example hand digits of the user 99, having dielectric different from air is placed near or on the corresponding sensing pad.

In accordance with various use cases, the self-capacitance of the electrode of the touch-sensing surface of corresponding sensing pad changes when the user 99 holds the handle 1204 of the exemplary GR device 1200 through various gripping techniques 1400A to 1400D, as illustrated in FIGS. 14A to 14D.

In a first example use case diagram, as illustrated in FIG. 14A, there is depicted a first grip technique 1400A for the multi-factor touch assertion. As shown, for holding the exemplary GR device 1200, the first grip technique 1400A corresponds to a first touch and a continually maintained assertion by a second digit 1404 of hand, i.e. the index finger, on at least one sensing pad, such as the first sensing pad 1212A, when the index finger is underneath the handle 1204. By way of such technique the thumb may not touch the opposite sensing pad and the handle 1204 appears to be resting entirely on the second digit. However, more than one sensing pads may also be asserted by the index finger based on placement of the hand of the user 99 on the handle 1204. For example, if the grip is substantially tight, the index finger may encompass up to three sensing pads, as shown in FIG. 14A. In such example, the fourth sensing pad may be asserted by the perlicue, i.e. the skin portion between the base on thumb and index finger when extended.

In a second example use case diagram, as illustrated in FIG. 14B, there is depicted a second grip technique 1400B for the multi-factor touch assertion. As shown, for holding the exemplary GR device 1200, the second grip technique 1400B corresponds to a first touch and second touch continually maintained assertions by the first digit 1402, i.e. the thumb, and a third digit 1406 of hand, i.e. the middle finger, on two or more sensing pads, such as the first and the third sensing pads 1212A and 1212C, respectively, and a third touch asserted by the second digit 1404 of the hand, i.e. the index finger, on a remaining sensing pad, such as the second sensing pad 1212B, between the first sensing pad 1212A and the third sensing pad 1212C.

In a third example use case diagram, as illustrated in FIG. 14C, there is depicted a third grip technique 1400C for the multi-factor touch assertion. As shown, for holding the exemplary GR device 1200, the third grip technique 1400C for the multi-factor touch assertion corresponds to the first touch and maintained assertion by a first digit 1402 of hand, i.e. the thumb, on at least one sensing pad, such as the first sensing pad 1212A, and a second touch asserted by the second digit 1404 of the hand, i.e. the index finger, on at least one remaining sensing pad, such as the third sensing pad 1212C, positionally opposite to the first sensing pad 1212A.

Figure 14D:
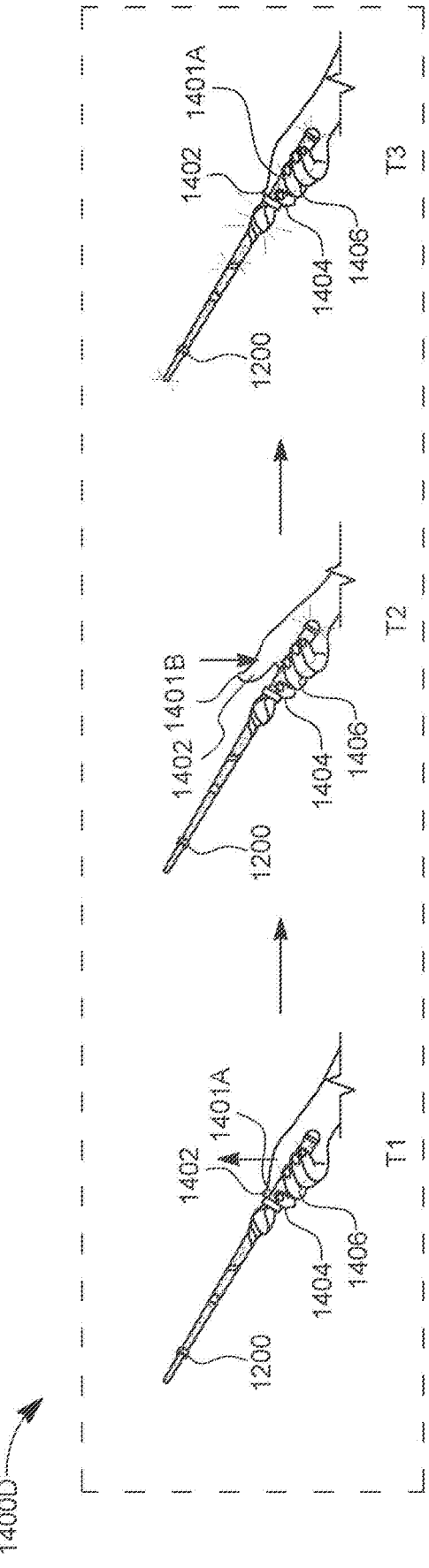

In a fourth example use case diagram, as illustrated in FIG. 14D, there is depicted a fourth grip technique 1400D for the multi-factor touch assertion. As shown, for holding the exemplary GR device 1200, the fourth grip technique for the multi-factor touch assertion corresponds to a tap gesture provided by the first digit 1402 or the second digit 1404 of hand on at least one sensing pad. The tap gesture may be detected by the accelerometers 172 in the IMU 108, coupled with the plurality of sensing pads of the capacitive touch sensor panel 1212. The accelerometers 172 may detect the tap gesture by movement of the first digit 1402 from a first position 1401A at timestamp T1 on the surface of the handle 1204, to a second position 1401B of the first digit at timestamp T2 away from the surface of the handle 1204, and then back to the first position 1401A at timestamp T3 on the surface of the handle 1204, as illustrated in FIG. 14D. Such a movement is detected as the tap gesture if the two times change in positions, i.e. from position 1401A to position 1401B, and then back to position 1401A, spans between timestamps T1 to T3 such that the time interval is less than a pre-defined threshold time interval value.

At 1308, an assertion signal may be generated in response to the detected multi-factor touch assertion. In accordance with an embodiment, the capacitive touch sensor controller 1218 may be configured to generate the assertion signal in response to the detected multi-factor touch assertion and transmit the generated assertion signal to the controller 106. The controller 106 may be configured to receive the generated assertion signal from the capacitive touch sensor controller 1218 for further processing of the assertion signal. In accordance with another embodiment, the controller 106 may be configured to directly generate the assertion signal in response to the detected multi-factor touch assertion.

As the multi-factor touch assertion is detected based on a change in the driving signal voltage before or after a touch or a rising or falling edge delay time of the driving signal to sense a change in capacitance before or after the touch (or a proximity touch) is provided. The controller 106 and/or the capacitive touch sensor controller 1218 converts a voltage received from touch (capacitive) sensors of the touch-sensing surface into digital data to generate raw data. In accordance with an embodiment, the controller 106 and/or the capacitive touch sensor controller 1218 may analyze the raw data based on a pre-stored touch recognition algorithm to detect the touch (or a proximity touch) input and generate a corresponding assertion signal.

In accordance with various embodiments, by using the exemplary GR device 1200, the assertion signal may be generated based on the detected multi-factor touch assertion for various grip techniques 1400A to 1400D, as illustrated in FIGS. 14A to 14D, as described in detail above. In accordance with different grip techniques, the multiple detection factors may be identified. The multiple detection factors may include a first detection factor, a second detection factor and an optional third detection factor.

The first detection factor of the multi-factor touch assertion may be an initial assertion of at least one sensing pad, for example the first sensing pad 1212A, on one side of the handle 1204 resulting from a natural or learned grip technique performed by the user 99. For example, the first detection factor may be identified corresponding to the first gripping technique 1400A.

The second detection factor may be a subsequent additional assertion of at least one opposite facing sensing pads, for example the first sensing pad 1212A and the third sensing pad 1212C, by the thumb or index finger of the user 99. For example, the second detection factor may be identified corresponding to the second and the third gripping technique 1400B and 1400C, respectively. In accordance with an embodiment, the second detection factor may be enhanced by monitoring and reacting to the amount of capacitance detected at the opposite facing (or remaining) sensing pads. Accordingly, the controller 106 may be configured to distinguish between the second detection factor and the first detection factor in an exemplary scenario when the finger (or the digit) of the user 99 overlaps with another pad(s) during the initial assertion of the at least one sensing pad (in accordance with the first detection factor). For example, in accordance the exemplary scenario, during the initial assertion, the index finger of the user 99 may partially overlap with the adjacent sensing pad (with a detected capacitance "c") while completely asserting the first sensing pad 1212A (with a detected capacitance "C1"). Thus, the amount of capacitance detected by the controller 106 may be "C1+c" as the first sensing pad 1212A is completely asserted and the adjacent sensing pad is partially asserted. On the other hand, during the subsequent assertion, the index finger of the user 99 completely asserts the first sensing pad 1212A (with the detected capacitance "C1") and the thumb completely asserts the opposite sensing pad, i.e. the third sensing pad 1212C (with a detected capacitance "C3"). Thus, the amount of capacitance detected by the controller 106 may be "C1+ C3" as two opposite sensing pads are completely asserted. Clearly, the amount of detected capacitance corresponding to the second detection factor is more than the first detection factor, based on which the controller 106 may distinguish between the two detection factors in case of such exemplary scenario.

The third optional detection factor may be sensing a three dimensional movement of the exemplary GR device 1200 during the subsequent additional assertion. An example of the third optional detection factor may correspond to a waving gesture performed by the user 99 holding the exemplary GR device 1200 during the subsequent additional assertion. Another example of the third optional detection factor may correspond to a tap gesture that may be detected by the accelerometers 172 in the IMU 108, in accordance with the fourth gripping technique 1400D. The third optional detection factor may be considered mandatory in all the gripping techniques 1400A to 1400D to further validate the user intent to use the exemplary GR device 1200 to minimize or exclude any possible occurrence of false positives.

In accordance with an embodiment, the assertion signal may be generated based on the detected multi-factor touch assertion for the plurality of grip techniques 1400A to 1400D. In accordance with an embodiment, the assertion signal generated by the capacitive touch sensor controller 1218 or the controller 106 may be further communicated to an external electronic device, such as a mobile device (for example a cell phone or a computing device on which corresponding application program is installed), via a communication channel. In such embodiment, the following steps 1310 to 1316 may be performed by an external controller of external electronic device, not shown for the sake of simplicity.

At 1310, a signal sequence may be determined based on the generated assertion signal. In accordance with an embodiment, the controller 106 may be configured to determine the signal sequence based on the generated assertion signal. In accordance with an embodiment, the controller 106 may be configured to communicate the generated assertion signal to the external controller, and the external controller may determine the signal sequence based on the received assertion signal. The controller 106 (or the external controller) may be configured to validate the determined signal sequence corresponding to the multi-factor touch assertion. Such validation may correspond to time stamps of the assertions of at least one of the plurality of sensing pads, optionally followed by an input from the IMU 108 (in accordance with the third detection factor) to better determine the user intent on a press gesture provided on the handle 1204 of the GR device 1200.

The controller 106 (or the external controller) may validate the determined signal sequence if the user 99 is holding the exemplary GR device 1200 based on one of the grip techniques as described in FIGS. 14A to 14D. For example, in accordance with the second gripping technique 1400B, a valid signal sequence may be if the user 99 holds the exemplary GR device 1200 by placing the third digit 1406 of hand, i.e. the middle finger, on the first sensing pad 1212A, and the first digit 1402 of the hand, i.e. the thumb, the third sensing pad 1212C, positionally opposite to the first sensing pad 1212A. Further, the second digit 1404 of hand, i.e. the index finger, is placed on the second sensing pad 1212B. Thus, a sequence of assertion signals corresponding to the first detection factor (due to initial assertion of the first sensing pad 1212A on one side of the handle 1204 resulting from a natural or learned grip technique performed by the user 99), the second detection factor (due to subsequent additional assertion of the positionally opposite third sensing pad 1212C by the thumb) and the third detection factor (due to sensing of the tap gesture or the three dimensional movement of the GR device 1200 during the subsequent additional assertion and within a time interval less than the pre-defined threshold time interval value) may correspond to a valid signal sequence.

On the contrary, the user 99 may hold the exemplary GR device 1200 in such a manner that all of the plurality of sensing pads of the capacitive touch sensor panel 1212 are asserted at once for a time interval that exceeds the pre-defined threshold time interval value. Further, the timestamp of such concurrent assertions are not separated as all of the plurality of sensing pads are asserted at the same time. Furthermore, the IMU 108 is not activated due to absence of any movement of the exemplary GR device 1200. In such case, the controller 106 (or the external controller) may register the assertion as a false positive. Accordingly, the controller 106 (or the external controller) may discard such assertion as being false positive. Thus, in accordance with a valid signal sequence, the controller 106 (or the external controller) may be configured to detect the first and the second detection factors followed by the third detection factor to exclude false positives and infer the user intent to use the exemplary GR device 1200 in a productive manner.

In accordance with an embodiment, there may be a possibility that the user 99 is unintentionally providing a first touch input and a subsequent second touch input by using only two digits, however, the placement of the digits is such that eventually all the four sensing pads are asserted. For example, as identified as the first detection factor, the user 99 may hold the exemplary GR device 1200 such that the second digit 1404 of hand, i.e. the index finger, is placed at a common edge between the first sensing pad 1212A and the second sensing pad 1212B, such that both the first sensing pad 1212A and the second sensing pad 1212B are asserted at once. In such case, as identified as the second detection factor, as a subsequent assertion, if the user places the first digit 1402 of the hand, i.e. the thumb, on the opposite side, i.e. at the common edge between the third sensing pad 1212C and the fourth sensing pad 1212D, the capacitive touch sensor the controller 106 (or the external controller) may not validate such signal sequence.

Accordingly, a sequence of assertions, i.e. the initial pair and/or subsequent pair of assertions at opposite sides must be followed by the third detection factor that corresponds to sensing a three dimensional movement of the GR device 1200 during the subsequent pair of assertion within a time interval that is less than the pre-defined threshold time interval value, as detected by the IMU 108 (for example, the accelerometers 172). Accordingly, the controller 106 (or the external controller) may validate the signal sequence and exclude any possibility of registering such signal sequence as a false positive.

At 1312, a user intent may be inferred based on the detected multi-factor touch assertion and determined signal sequence. In accordance with an embodiment, the controller 106 (or the external controller) may be configured to infer the user intent based on the detected multi-factor touch assertion and determined signal sequence. The user intent may be inferred based on a combination of type of grip technique on the handle 1204 and subsequent finger and/or thumb press performed by the user 99, and also the time sequence of assertions. An example of inferring the user intent may be based on how the user 99 holds the exemplary GR device 1200, such as a smart and interactive wand, based on the one or more factors and how the user 99 performs a gesture, for example press and hold the wand with the thumb once or move the wand around in the air, to cast a spell.

At 1314, a current inactive state of the exemplary GR device 1200 may be converted to an active state based on a validation of the determined signal sequence corresponding to the multi-factor touch assertion and inferred user intent. In accordance with an embodiment, the controller 106 may be configured to convert the current inactive state of the exemplary GR device 1200 may be converted to an active state based on the validation of the determined signal sequence corresponding to the multi-factor touch assertion and inferred user intent, as discussed above. The conversion of the current state of the exemplary GR device 1200 to the active state may be further based on the driving signal received from the controller 106 and a touch gesture received from at least a digit of hand of the user 99. Once in the active state, the exemplary GR device 1200 may be used in the context of the connected environment 200, as described in detail in FIG. 2. For example, the activated GR device 1200 may be configured to control other connected devices based on gestures and/or voice commands of the user 99, control virtual objects in an AR or VR environment, interact with real and/or virtual objects or projected images, unlock additional content and/or bonus features in an entertainment setting, control the narrative of a movie, or identify an item selected by a customer using gesture control in a retail store.

After step 1314, the control passes to step 1306 to detect the multi-factor touch assertion from the activated plurality of sensing pads. In an embodiment when the multi-factor touch assertion is detected, the control passes to step 1308, and the process continues, as described above. However, in another embodiment when the multi-factor touch assertion is not detected, the control passes to step 1316.

At 1316, the active state of the exemplary GR device 1200 may be converted to a sleep state in absence of the multi-factor touch assertion at the set of sensing pads for a pre-defined time duration. In accordance with an embodiment, the controller 106 (or the external controller) may be configured to convert the active state of the exemplary GR device 1200 to the sleep state in absence of the multi-factor touch assertion at the set of sensing pads for a pre-defined time duration.

The state of the exemplary GR device 1200, which is currently in the sleep state, may be changed back to the active state based on various mechanisms. In accordance with a first mechanism, when there is any movement, for example lifting, detected by one or more components in the IMU 108. In accordance with a second mechanism, for each of the plurality of capacitive touch sensors in the capacitive touch sensor panel 1212, the sensing period and the duty cycle may be reduced to a value less than a threshold value. In other words, the less frequent touch sensing period and slower duty cycles of the capacitive touch sensors may be implemented that eventually reduces the power consumption of the exemplary GR device 1200.

Figure 15:
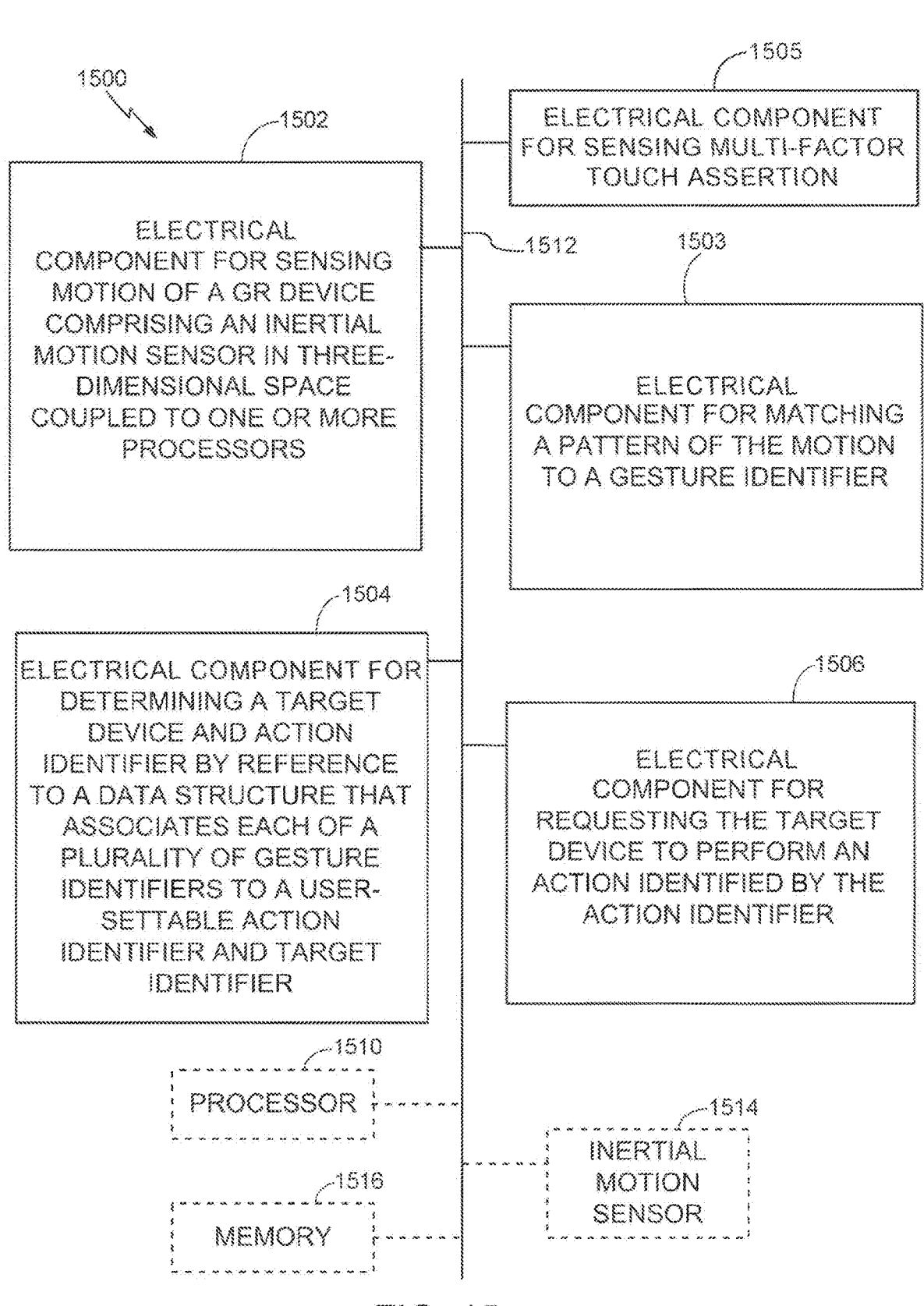
FIG. 15 is a conceptual block diagram illustrating components of an apparatus or system for providing a gesture-centric user interface for controlling one or more connected devices.

FIG. 15 shows components of an apparatus or system 1500 for providing a gesture-centric user interface for multiple target devices and sensing multi-factor touch assertion as described herein, according to methods 1100 and 1300. As depicted, the apparatus or system 1500 may include functional blocks that can represent functions implemented by a processor, software, or combination thereof (e.g., firmware).

The apparatus or system 1500 may comprise an electrical component 1502 for sensing motion of a GR device comprising an inertial motion sensor in three-dimensional space coupled to one or more processors. The component 1502 may be, or may include, a means for said sensing. Said means may include the processor 1510 coupled to the memory 1516, and to the inertial motion sensor 14, the processor executing an algorithm based on program instructions stored in the memory. Such algorithm may include a sequence of more detailed operations, for example, method 700 as described in connection with FIG. 7.

The apparatus or system 1500 may further comprise an electrical component 1503 for matching a pattern of the motion to a gesture identifier, e.g., recognizing the gesture. The component 1503 may be, or may include, a means for said matching or recognizing. Said means may include the processor 1510 coupled to the memory 1516, the processor executing an algorithm based on program instructions stored in the memory. Such algorithm may include a sequence of more detailed operations, for example, method 804 as described in connection with FIG. 8B.

The apparatus or system 1500 may further comprise an electrical component 1504 for determining a target device and action identifier by reference to a data structure that associates each of a plurality of gesture identifiers to a user-settable action identifier and target identifier. The component 1504 may be, or may include, a means for said matching. Said means may include the processor 1510 coupled to the memory 1516 containing a library data structure, the processor executing an algorithm based on program instructions stored in the memory. Such algorithm may include a sequence of more detailed operations, for example, the method 800 described in connection with FIG. 8A.

The apparatus or system 1500 may further comprise an electrical component 1505 for sensing multi-factor touch assertion. The component 1505 may be, or may include, a means for said sensing. Said means may include the processor 1510 coupled to the memory 1516 containing a library data structure, the processor executing an algorithm based on program instructions stored in the memory. Such algorithm may include a sequence of more detailed operations, for example, the method 1300 described in connection with FIG. 13.

The apparatus or system 1500 may further comprise an electrical component 1506 for requesting the target device to perform an action identified by the action identifier. The component 1506 may be, or may include, a means for said requesting. Said means may include the processor 1510 coupled to the memory 1516, and to a network interface device, the processor executing an algorithm based on program instructions stored in the memory. Such algorithm may include a sequence of more detailed operations, for example, the method 900 described in connection with FIG. 9.

The apparatus 1500 may optionally include a processor module 1510 having at least one processor, in the case of the apparatus 1500 configured as a data processor. The processor 1510, in such case, may be in operative communication with the modules 1502-1506 via a bus 1512 or other communication coupling, for example, a network. The processor 1510 may initiate and schedule the processes or functions performed by electrical components 1502-1506. The electrical components 1502-1506 may also be referred to as circuits or circuitry.

In related aspects, the apparatus 1500 may include a network interface module (not shown in FIG. 15, shown in FIG. 1) operable for communicating with a targeted clients and network resources over a computer network. In further related aspects, the apparatus 1500 may optionally include a module for storing information, such as, for example, a memory device/module 1516. The computer readable medium or the memory module 1516 may be operatively coupled to the other components of the apparatus 1500 via the bus 1512 or the like. The memory module 1516 may be adapted to store computer readable instructions and data for effecting the processes and behavior of the modules 1502-1506, and subcomponents thereof, or the processor 1510, or the any method or process described herein. The memory module 1516 may retain instructions for executing functions associated with the modules 1502-1506. While shown as being external to the memory 1516, it is to be understood that the modules 1502-1506 can exist within the memory 1516.

The proposed exemplary GR device 1200 and the method provides various advantages, such as a miniaturized form factor with low cost as compared to the existing solutions. The multi-factor touch assertion provides another advantage is that it is less likely to register false positives. Further, due to less frequent touch sensing period and slower duty cycles of the capacitive touch sensors, power consumption of the exemplary GR device 1200 may be reduced to a substantial extent as compared to existing solutions.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A gesture recognition device comprising memory and one or more processors communicatively coupled to the memory, the one or more processors configured to:
    detect, via a set of capacitive touch sensing pads of the gesture recognition device a multi-factor touch assertion, wherein the multi-factor touch assertion corresponds to a recognized grip technique of the gesture recognition device of a plurality of grip techniques;
    generate an assertion signal that corresponds to the multi-factor touch assertion for the recognized grip technique of the gesture recognition device; and
    communicate the assertion signal.

2. The gesture recognition device of claim 1, wherein the recognized grip technique is detected based, at least in part, on a change in capacitance at the set of capacitive touch sensing pads of the gesture recognition device.

3. The gesture recognition device of claim 1, wherein the gesture recognition device comprises an elongated cylindrical body and the set of capacitive touch sensing pads is arranged in a cylindrical pattern along the elongated cylindrical body.

4. The gesture recognition device of claim 1, the one or more processors further configured to:
    convert a current inactive state of the gesture recognition device to an active state responsive to the assertion signal.

5. The gesture recognition device of claim 4, wherein, in response to the gesture recognition device being in the active state, the one or more processors are further configured to:
    detect, via a motion sensor, a recognized movement of a plurality of recognized movements of the gesture recognition device;
    generate a command based on the recognized movement; and
    transmit the command to a target device.

6. The gesture recognition device of claim 5, wherein the command is based on the recognized movement and the recognized grip technique.

7. The gesture recognition device of claim 6, wherein the command is identified from a command library comprising a plurality of commands corresponding to at least one of the plurality of recognized movements or the plurality of grip techniques.

8. The gesture recognition device of claim 5, wherein the motion sensor comprises an inertial measurement unit and the recognized movement of the gesture recognition device comprises at least one of a tap gesture or a three-dimensional movement of the gesture recognition device.

9. The gesture recognition device of claim 8, wherein the inertial measurement unit is configured to sense three-dimensional motion in three linear axes and three rotational axes.

10. A computer-implemented method for a gesture recognition device, comprising:
    detecting, via a set of capacitive touch sensing pads of a gesture recognition device a multi-factor touch assertion, wherein the multi-factor touch assertion corresponds to a recognized grip technique of the gesture recognition device of a plurality of grip techniques;
    generating an assertion signal that corresponds to the multi-factor touch assertion for the recognized grip technique of the gesture recognition device; and
    communicating the assertion signal.

11. The computer-implemented method of claim 10, wherein the recognized grip technique is detected based, at least in part, on a change in capacitance at the set of capacitive touch sensing pads of the gesture recognition device.

12. The computer-implemented method of claim 10, further comprising:
    converting a current inactive state of the gesture recognition device to an active state responsive to the assertion signal.

13. The computer-implemented method of claim 12, wherein, in response to the gesture recognition device being in the active state, the computer-implemented method further comprises:
    detecting, via a motion sensor, a recognized movement of a plurality of recognized movements of the gesture recognition device;
    generating a command based on the recognized movement; and
    transmitting the command to a target device.

14. The computer-implemented method of claim 13, wherein the command is based on the recognized movement and the recognized grip technique.

15. The computer-implemented method of claim 14, wherein the command is identified from a command library comprising a plurality of commands corresponding to at least one of the plurality of recognized movements or the plurality of grip techniques.

16. The computer-implemented method of claim 14, wherein the motion sensor comprises an inertial measurement unit and the recognized movement of the gesture recognition device comprises at least one of a tap gesture or a three-dimensional movement of the gesture recognition device.

17. The computer-implemented method of claim 16, wherein the inertial measurement unit is configured to sense three-dimensional motion in three linear axes and three rotational axes.

18. A computer program product including one or more non-transitory computer-readable storage media including instructions that, when executed by one or more processors, cause the one or more processors to:
    detect, via a set of capacitive touch sensing pads of a gesture recognition device a multi-factor touch assertion, wherein the multi-factor touch assertion corresponds to a recognized grip technique of the gesture recognition device of a plurality of grip techniques;
    generate an assertion signal that corresponds to the multi-factor touch assertion for the recognized grip technique of the gesture recognition device; and
    communicate the assertion signal.

19. The computer program product of claim 18, wherein the recognized grip technique is detected based, at least in part, on a change in capacitance at the set of capacitive touch sensing pads of the device.

20. The computer program product of claim 18, the one or more processors further configured to:

convert a current inactive state of the gesture recognition device to an active state responsive to the assertion signal.

\* \* \* \* \*